United States Patent [19]

Keane et al.

[11] Patent Number: 4,533,941
[45] Date of Patent: Aug. 6, 1985

[54] METHOD AND APPARATUS FOR HALF-TONE REPRODUCTION OF A VARYING TONE ORIGINAL IMAGE

[75] Inventors: John F. Keane, Bellbrook; John C. Butler; Timothy H. Archer, both of Centerville, all of Ohio

[73] Assignee: Coulter Systems Corporation, Bedford, Mass.

[21] Appl. No.: 458,167

[22] Filed: Jan. 14, 1983

[51] Int. Cl.³ ............................................. H04N 1/46
[52] U.S. Cl. ........................................ 358/75; 358/78
[58] Field of Search ................................... 358/75, 78

[56] References Cited

U.S. PATENT DOCUMENTS 4,350,996 9/1982 Rosenfeld ............................ 358/75
4,419,690 12/1983 Hammes ............................... 358/75
4,419,691 12/1983 Sing et al. ............................ 358/75

Primary Examiner—Howard W. Britton
Assistant Examiner—Michael Dunnam
Attorney, Agent, or Firm—Silverman, Cass & Singer

[57] ABSTRACT

Sequential scanned scaled density data representing a varying tone image is electronically screened to form binary element data that when imaged to form an array of orthogonally arranged binary elements on a member produces screened color separation plates of that original image suitable for use as the printing plates in a lithographic printing press. Screening occurs by comparing sequential density data with selected screen matrix data contained in a memory. The matrix data is ordered with density values increasing outwardly from the matrix center to the corners and edges. The matrix data is selected from matrix locations related to the desired screen frequency and angle with the selected matrix locations being determined by the application of fundamental right triangle trigonometric relationships to the matrix. Screening and imaging occurs sequentially with two density data being compared to matrix data simultaneously. The binary elements of the several plates are produced in one pass across the surface of the member.

33 Claims, 16 Drawing Figures

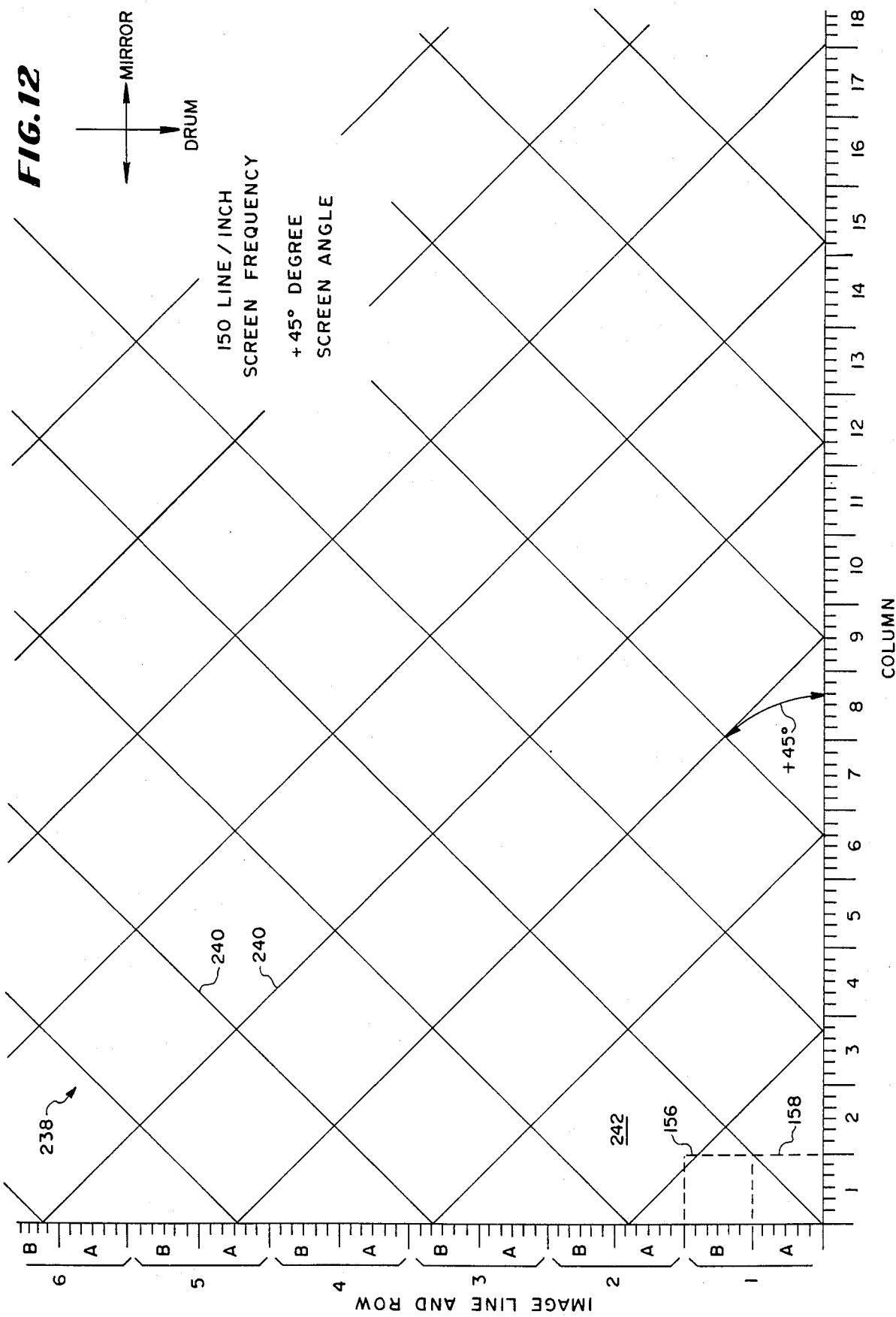

| Y\X | 01 | 02 | 03 | 04 | 05 | 06 | 07 | 08 | 09 | 10 | 11 | 12 | 13 | 14 | 15 | 16 |
|---|---|---|---|---|---|---|---|---|---|---|---|---|---|---|---|---|
| 01 | 255 | 254 | 251 | 247 | 243 | 237 | 230 | 222 | 214 | 203 | 192 | 180 | 169 | 155 | 140 | 124 |
| 02 | 254 | 251 | 247 | 242 | 237 | 230 | 222 | 213 | 203 | 192 | 180 | 168 | 155 | 140 | 124 | 109 |
| 03 | 251 | 247 | 242 | 236 | 230 | 222 | 213 | 202 | 192 | 180 | 168 | 154 | 140 | 124 | 109 | 95 |
| 04 | 247 | 242 | 236 | 229 | 222 | 213 | 202 | 191 | 180 | 168 | 154 | 139 | 123 | 108 | 94 | 81 |
| 05 | 242 | 236 | 229 | 222 | 213 | 202 | 191 | 180 | 168 | 154 | 139 | 123 | 108 | 94 | 81 | 69 |
| 06 | 236 | 229 | 222 | 213 | 202 | 191 | 180 | 167 | 154 | 139 | 123 | 108 | 94 | 81 | 69 | 58 |
| 07 | 229 | 221 | 213 | 202 | 191 | 180 | 167 | 153 | 139 | 123 | 108 | 94 | 81 | 69 | 58 | 48 |
| 08 | 221 | 212 | 202 | 191 | 180 | 167 | 153 | 138 | 122 | 107 | 93 | 80 | 68 | 57 | 47 | 38 |
| 09 | 212 | 201 | 190 | 179 | 167 | 153 | 138 | 122 | 107 | 93 | 80 | 68 | 57 | 47 | 38 | 30 |
| 10 | 201 | 190 | 179 | 166 | 153 | 138 | 122 | 107 | 93 | 80 | 68 | 57 | 47 | 38 | 30 | 23 |
| 11 | 190 | 179 | 166 | 152 | 138 | 122 | 107 | 93 | 80 | 68 | 57 | 47 | 38 | 30 | 23 | 17 |
| 12 | 179 | 166 | 152 | 137 | 121 | 106 | 92 | 79 | 67 | 56 | 46 | 37 | 29 | 22 | 16 | 11 |
| 13 | 166 | 152 | 137 | 121 | 106 | 92 | 79 | 67 | 56 | 46 | 37 | 29 | 22 | 16 | 11 | 9 |
| 14 | 152 | 137 | 121 | 106 | 92 | 79 | 67 | 56 | 46 | 37 | 29 | 22 | 16 | 11 | 8 | 5 |
| 15 | 137 | 121 | 106 | 92 | 78 | 66 | 55 | 45 | 36 | 28 | 21 | 15 | 11 | 8 | 4 | 2 |
| 16 | 136 | 120 | 105 | 91 | 78 | 66 | 55 | 45 | 36 | 28 | 21 | 15 | 10 | 8 | 4 | 1 |
| 17 | 136 | 120 | 105 | 91 | 78 | 66 | 55 | 45 | 36 | 28 | 21 | 15 | 10 | 7 | 4 | 1 |
| 18 | 144 | 136 | 120 | 105 | 91 | 78 | 66 | 55 | 45 | 36 | 28 | 21 | 15 | 15 | 7 | 3 |
| 19 | 158 | 144 | 136 | 120 | 105 | 91 | 78 | 66 | 55 | 45 | 36 | 28 | 21 | 20 | 14 | 7 |
| 20 | 172 | 158 | 143 | 135 | 119 | 104 | 90 | 77 | 65 | 54 | 44 | 35 | 27 | 27 | 20 | 10 |
| 21 | 183 | 172 | 158 | 143 | 135 | 119 | 104 | 90 | 77 | 65 | 54 | 44 | 35 | 35 | 27 | 14 |
| 22 | 195 | 183 | 171 | 158 | 143 | 135 | 119 | 104 | 90 | 77 | 65 | 54 | 44 | 44 | 35 | 20 |
| 23 | 205 | 195 | 183 | 171 | 157 | 143 | 135 | 119 | 104 | 90 | 77 | 65 | 54 | 53 | 43 | 27 |
| 24 | 216 | 205 | 194 | 183 | 171 | 157 | 142 | 134 | 118 | 103 | 89 | 76 | 64 | 64 | 53 | 34 |
| 25 | 224 | 216 | 205 | 194 | 182 | 171 | 157 | 142 | 134 | 118 | 103 | 89 | 76 | 76 | 64 | 43 |
| 26 | 232 | 224 | 213 | 205 | 194 | 182 | 170 | 157 | 142 | 134 | 118 | 103 | 89 | 89 | 76 | 53 |
| 27 | 238 | 232 | 224 | 215 | 204 | 194 | 182 | 170 | 156 | 142 | 133 | 118 | 103 | 102 | 88 | 64 |
| 28 | 244 | 238 | 231 | 224 | 215 | 204 | 193 | 182 | 170 | 156 | 141 | 133 | 117 | 117 | 102 | 75 |
| 29 | 248 | 244 | 238 | 231 | 223 | 215 | 204 | 193 | 181 | 170 | 156 | 141 | 133 | 133 | 117 | 88 |
| 30 | 252 | 248 | 243 | 238 | 231 | 223 | 214 | 204 | 193 | 181 | 169 | 156 | 141 | 141 | 133 | 102 |
| 31 | 254 | 252 | 248 | 243 | 237 | 231 | 223 | 214 | 203 | 193 | 181 | 169 | 155 | 155 | 140 | 117 |
| 32 | 255 | 254 | 231 | 248 | 243 | 237 | 230 | 223 | 214 | 203 | 192 | 181 | 169 | 155 | | 132 |

| Y ADDRESS | X ADDRESS | | | | | | | | | | | | | | | | |
|---|---|---|---|---|---|---|---|---|---|---|---|---|---|---|---|---|---|
| | 17 | 18 | 19 | 20 | 21 | 22 | 23 | 24 | 25 | 26 | 27 | 28 | 29 | 30 | 31 | 32 |
| 01 | 124 | 148 | 162 | 175 | 187 | 198 | 209 | 218 | 227 | 234 | 240 | 245 | 250 | 253 | 255 | 255 |
| 02 | 109 | 125 | 148 | 162 | 176 | 187 | 198 | 209 | 219 | 270 | 234 | 240 | 246 | 250 | 253 | 255 |
| 03 | 95 | 109 | 125 | 148 | 163 | 176 | 187 | 198 | 210 | 219 | 227 | 234 | 241 | 246 | 250 | 253 |
| 04 | 82 | 95 | 110 | 125 | 149 | 163 | 176 | 187 | 199 | 210 | 219 | 227 | 235 | 241 | 246 | 250 |
| 05 | 69 | 82 | 95 | 110 | 125 | 149 | 163 | 176 | 188 | 199 | 210 | 219 | 228 | 235 | 241 | 246 |
| 06 | 58 | 70 | 82 | 96 | 110 | 126 | 149 | 163 | 177 | 188 | 199 | 210 | 220 | 228 | 235 | 241 |
| 07 | 48 | 58 | 70 | 82 | 96 | 110 | 126 | 149 | 164 | 177 | 188 | 199 | 211 | 220 | 228 | 235 |
| 08 | 39 | 48 | 59 | 70 | 83 | 96 | 111 | 126 | 150 | 164 | 177 | 188 | 200 | 211 | 220 | 228 |
| 09 | 30 | 39 | 48 | 59 | 70 | 83 | 96 | 111 | 126 | 150 | 164 | 177 | 189 | 200 | 211 | 220 |
| 10 | 23 | 31 | 39 | 49 | 59 | 71 | 83 | 97 | 111 | 127 | 150 | 164 | 178 | 189 | 200 | 211 |
| 11 | 17 | 23 | 31 | 39 | 49 | 59 | 71 | 83 | 97 | 111 | 127 | 150 | 165 | 178 | 189 | 200 |
| 12 | 12 | 17 | 24 | 31 | 40 | 49 | 60 | 71 | 84 | 97 | 127 | 150 | 151 | 165 | 178 | 189 |
| 13 | 9 | 12 | 17 | 24 | 31 | 40 | 49 | 60 | 71 | 84 | 97 | 112 | 127 | 151 | 165 | 178 |
| 14 | 5 | 5 | 12 | 18 | 24 | 32 | 40 | 50 | 60 | 72 | 84 | 98 | 112 | 128 | 151 | 165 |
| 15 | 2 | 2 | 5 | 9 | 13 | 18 | 25 | 32 | 41 | 50 | 72 | 98 | 98 | 112 | 128 | 151 |
| 16 | 1 | 2 | 6 | 9 | 13 | 18 | 25 | 32 | 41 | 50 | 61 | 72 | 85 | 113 | 113 | 128 |
| 17 | 3 | 3 | 6 | 9 | 13 | 25 | 25 | 41 | 41 | 61 | 61 | 72 | 85 | 113 | 129 | 144 |
| 18 | 7 | 6 | 13 | 19 | 19 | 33 | 33 | 51 | 51 | 73 | 73 | 85 | 99 | 124 | 144 | 159 |
| 19 | 10 | 14 | 19 | 26 | 25 | 42 | 41 | 62 | 62 | 86 | 85 | 99 | 113 | 124 | 144 | 159 |
| 20 | 14 | 19 | 26 | 33 | 33 | 51 | 51 | 73 | 73 | 99 | 99 | 114 | 129 | 145 | 159 | 172 |
| 21 | 20 | 26 | 34 | 42 | 42 | 62 | 62 | 86 | 86 | 114 | 114 | 129 | 145 | 159 | 172 | 184 |
| 22 | 26 | 34 | 42 | 52 | 52 | 74 | 74 | 100 | 100 | 130 | 130 | 145 | 159 | 173 | 184 | 195 |
| 23 | 34 | 43 | 52 | 63 | 62 | 87 | 86 | 115 | 114 | 146 | 145 | 160 | 173 | 184 | 195 | 206 |
| 24 | 43 | 52 | 63 | 74 | 74 | 100 | 100 | 130 | 130 | 160 | 160 | 173 | 184 | 196 | 206 | 216 |
| 25 | 53 | 63 | 75 | 87 | 87 | 115 | 115 | 146 | 146 | 174 | 173 | 185 | 186 | 207 | 216 | 225 |
| 26 | 63 | 75 | 87 | 101 | 101 | 131 | 131 | 161 | 160 | 185 | 185 | 196 | 207 | 217 | 225 | 232 |
| 27 | 75 | 88 | 101 | 116 | 115 | 147 | 146 | 174 | 174 | 197 | 196 | 207 | 217 | 225 | 232 | 239 |
| 28 | 88 | 101 | 116 | 131 | 131 | 161 | 161 | 186 | 185 | 208 | 207 | 217 | 225 | 233 | 239 | 244 |
| 29 | 102 | 116 | 132 | 147 | 147 | 175 | 174 | 197 | 197 | 218 | 218 | 226 | 233 | 239 | 244 | 249 |
| 30 | 116 | 132 | 147 | 162 | 161 | 186 | 186 | 209 | 208 | 226 | 226 | 233 | 239 | 245 | 249 | 252 |
| 31 | 132 | 148 | 162 | 175 | 175 | 198 | 197 | 218 | 218 | 234 | 233 | 240 | 245 | 249 | 252 | 255 |
| 32 | | 148 | | | 186 | | 209 | | 226 | | 240 | 245 | 249 | 253 | 255 | 255 |

METHOD AND APPARATUS FOR HALF-TONE REPRODUCTION OF A VARYING TONE ORIGINAL IMAGE

BACKGROUND OF THE INVENTION

This invention relates to methods and apparatus for providing screened plates used in printing half-tone graphics images and, in particular, relates to electronic screening of scaled density information representing a multi-color continuous-tone graphics image with screen matrix information data to produce binary element information data. The binary element information data thereafter is used to image electrophotographic members and produce thereon color separation screened representations of the original continuous tone image, each screened representation being at the correct angle.

A continuous-tone image is any painting, scene or photograph in which there is a broad range of tones or gradation of tones. In a black and white photograph, these tones may be represented by varying amounts of black-looking, developed silver. The more silver in certain areas, the darker or blacker the tone. In color photographs the tones are represented in the same way by varying amounts of developed dyes.

In letter press and offset lithography, continuous tones cannot be printed directly by varying the amounts of ink. A printing press can print only a solid area of ink while leaving other areas unprinted. Half-tone printing reproduction of continuous-tone images was developed to overcome this limitation of a printing press.

Half-tone printing uses the poor resolution of the human eye to reproduce the continuous-tone image with an array of dots. In manual half-tone printing these dots are regularly spaced apart and are of variable area. Portions of the image that are dark are known as the shadows and have large area dots; portions that are light are known as highlights and have small area dots. The human eye fails to recognize individual ones of the dots due to its poor resolution and tends to integrate the dots together into apparent continuous tones.

A single dot array for printing one color or black is produced by photographing the continuous-tone image through an orthogonal screen of lines. Shadows of the original image produce dots of large area in the photographic positive while highlights produce dots of small area in the photographic positive. The photographic positive then may be used as the printing plate to print certain solid areas with ink while leaving other areas unprinted.

This is the type of graphics reproduction often used in newspapers. Increasing the number of lines per inch produces a sharper printed image. Typically screen rulings or frequencies are from 65–300 lines per inch with the finer rulings being used for higher quality reproduction, and 150 lines per inch typically being used for offset lithography.

Color continuous-tone images are reproduced with a plurality of dot arrays using the three color theory of white light. Under that theory white light will be perceived by the human brain from the addition of red, green and blue colors, the additive primaries. By photographing the continuous-tone image through filters of the additive primaries and the half-tone screen, three separate arrays of dots are formed. These dot arrays then are printed using the subtractive primary colors of yellow, cyan and magenta to reproduce the color of the original image. An array of black dots also is printed to increase the quality of the printed image.

Better quality color graphics printing is obtained by increasing the number of different colors that are printed. This overcomes insufficiencies in the dyes available for both the inks and filters. Of course, the array of dots for each printed color is formed by photographing the original through a related color filter and a half-tone screen.

The arrays of dots are printed with the dots arranged at angles different from one another. This is to avoid over-printing each color dot on the previously printed dot or dots and to avoid Moire patterning. Moire patterning results when screens of equal frequency lines are slightly offset from one another and produces an undesirable effect in the printed image. These angles are obtained not by rotating the dot arrays after they are photographed through the screens, but by rotating the half-tone screen to different screen angles during the formation of the dot arrays on the photographic negative.

Moire patterning is minimal when the screen angles are about 30° apart from one another. The angles typically used for the four screens are: black 45°, Magenta 75°; yellow 90° and cyan 105° from a vertical reference. The screens are formed of orthogonal lines and thus the angles may also be related to a horizontal reference and further may be described as: black +45°, magenta +15°, yellow 0° and cyan −15°.

Manual half tone processing is labor intensive, time consuming and expensive. It requires considerable skill and much capital equipment to produce large quantities of printing plates for such as the printing of periodicals, magazines, books and other widely circulated printed matter.

Manual half-tone processing recently has been implemented electronically. Arrays of orthogonally aligned dots are formed in which the dots are regularly spaced from one another and have equal areas, but are much smaller than the dots typically used in manual half-tone printing. Shadows are represented by forming several dots close to one another while highlights are represented by forming few dots far from one another.

In electronic half-tone processing the original continuous-tone image is scanned with a light sensitive instrument to determine the scaled density of sequential adjacent incremental areas. The output of such scanning apparatus is a stream of multibit digital words with the value of each word representing the scaled density of an individual incremental area and the entirety of the words representing the density of the original image.

The stream of digital words is operated on by a screening circuit. The output of the screening circuit is a series of binary signals indicating the formation of binary elements on an image member. The image member is capable of having binary elements formed thereon in orthogonally arranged rows and columns of incremental areas by such as radiant energy means such as a laser. The binary signals indicate whether an element will or will not be formed in the incremental areas and control whether or not the radiant energy will impinge on the image member.

Each density value word from the scanner generally will determine which ones of a group of binary elements will be formed, the groupings of elements being generally referred to as picture elements or pixels. Thus, one density value digital word from the scanner apparatus will control the formation of binary elements in one image pixel.

After the image member is completely imaged, the member is operated on to form a printing plate, one image member forming a printing plate for each color.

In color electronic half-tone processing the original image is scanned through different color filters as in manual processing. Each such scan produces a set of scaled density data corresponding to the original image, less the filtered color. But electronically screening the scaled density data has been a problem.

The problem is introducing the screen frequency and angle information into the scaled density data of each color so that the imaged electronic dots are properly overlapped, if desired, and are properly registered one to another to avoid Moire patterning. The data from the scanning apparatus is only scaled density information with corresponding data in each color separation being obtained simultaneously from one incremental area. The scanning apparatus usually does not scan at different locations for each color. Essentially, the data from the scanning apparatus is devoid of all screen information. In manual half-tone processing screen angle information is provided by rotating the screen to different angles and overlap and moire patterning are avoided by proper registration of the photographic and printing plates. Screen frequency information is obtained by the number of lines per inch in the screen itself. Electronic half-tone processing somehow must provide this angle and frequency information.

Introducing the screen angle information into the data from the scanner by scanning at different screen angles is not desired. The scaled density data for each of the several colors are obtained simultaneously from one incremental area by scanning the area with white light and separating the different color densities with color filters. Scanning at different locations and angles for each color separation unacceptably multiplies the scanning time by the number of colors to be scanned.

The prior art does not solve this problem. U.S. Pat. No. 3,922,484 to Keller performs electronic screening without regard to overlap or Moire patterning. The density data for each color separation is imaged according to a predetermined format of density representing printing patterns and the printing patterns are printed on the receptor with whatever super impositioning that occurs.

U.S. Pat. No. 4,012,584 to Gascoigne introduces the screen matrix information including the screen angle into the density data through the use of "1" shifting shift registers. The density data from the scanning unit are acted on by a color computation unit that controls the length of trains of binary "1" signals introduced into the opposite ends of pairs of shift registers. The shift registers then are stepped in opposite directions and whenever corresponding locations of the pair of shift registers contain binary "1" signals, a binary element is formed by a light source element. Varying screen angles are obtained by stepping the shift registers of each pair at different frequencies.

U.S. Pat. No. 4,051,536 to Roetling performs the screening function by summing the scanned density information from several incremental areas corresponding to the screen with the values of the half-tone screen function. In another channel, the same scanned density information from the several areas is averaged and the average determines the percent of dots to be formed in that area. The summation then is thresholded until the determined percent of dots is formed. No color half-tone screening at different angles is disclosed.

U.S. Pat. No. 4,196,453 to Warren performs the screening function by storing a line-at-a-time the scaled density information data in buffers and operating on the buffered data in blocks of twenty lines by twenty pixels. The scaled density information datum for each pixel on each line then is compared to a screen matrix value stored in a memory device and results in a binary output from the comparator. The overall density value of each block is ascertained to select between available screens. The binary output from the comparator then is used to provide an image on a xerographic member. No disclosure is made of imaging at different screen angles and no color processing is disclosed.

Further, it would be desirable to introduce the screen frequency and angle information into the scaled density information for varying frequencies and angles. The electronically screened frequencies must at least equal the currently used manually produced screen frequencies of 65–300 lines per inch and preferably should exceed this range. The angles provided electronically must at least be those currently used and preferably should be any angle desired. Selection of the desired screen frequency and angle must occur simply and with the use of unskilled labor to improve over the cost of manual half-tone processing.

The time required to perform the electronic screening also is important. Processing an original image electronically from scanning to ready-to-print plates must be at least as fast as manual half-tone processing. Preferably, electronic screening and imaging on an electrophotographic member should occur as fast as scanning, and should be fast enough to accept scanned data directly from long distance data links to realize real-time processing economics.

SUMMARY OF THE INVENTION

In accordance with the invention there is provided an electronic screening circuit for combining screen frequency and angle information with scanned density information representing the varying tone of an original image. The result is binary element information that thereafter is used to image a member by forming binary elements thereon, the binary elements forming half-tone reproductions of the original image at the desired screen frequency and angle.

The screen frequency and angle information is obtained by providing screen matrix information data values ordered to represent one period of the lowest screen frequency desired. Screen matrix information data values then are read from positions of the matrix that are determined according to fundamental trigonometric relationships related to the desired screen frequency and angle. The selected matrix values are compared to the scaled density data to produce the binary element information in turn used to form the binary elements on the member.

Determination of the screen matrix positions occurs independent of the scaled density information.

Reading of screen matrix data values and comparison to scaled density data values occurs in parallel to realize high speed operation.

One scaled density datum is used to form binary elements in one image pixel. The binary elements are formed on the member in image incremental areas described by an orthogonal coordinate system. The screen frequency and angle are described according to this coordinate system but are formed independent thereof.

The binary elements are formed by forming or not forming corresponding rays of radiant energy in response to the binary element information data. The rays are swept across the member in parallel image lines that are several rays wide and many steps long. One image incremental area is described by the intersection of one ray position and one step. One image pixel is described by a fixed number of image incremental areas.

Multiple half-tone reproductions or color separations of the original image are made in one pass of the rays of radiant energy across the member. Thereafter, the member may be processed to form the printing plate in a lithographic printing press.

BRIEF DESCRIPTION OF THE DRAWING

FIG. 12 is a chart illustrating a portion of a half-tone screen having a frequency of 150 lines per inch and a 45 degree screen screen angle.

FIGS. 13A and 13B are charts respectively of the left and right halves of a matrix of screen matrix information data values;

DESCRIPTION OF THE PREFERRED EMBODIMENT

Figure 1:
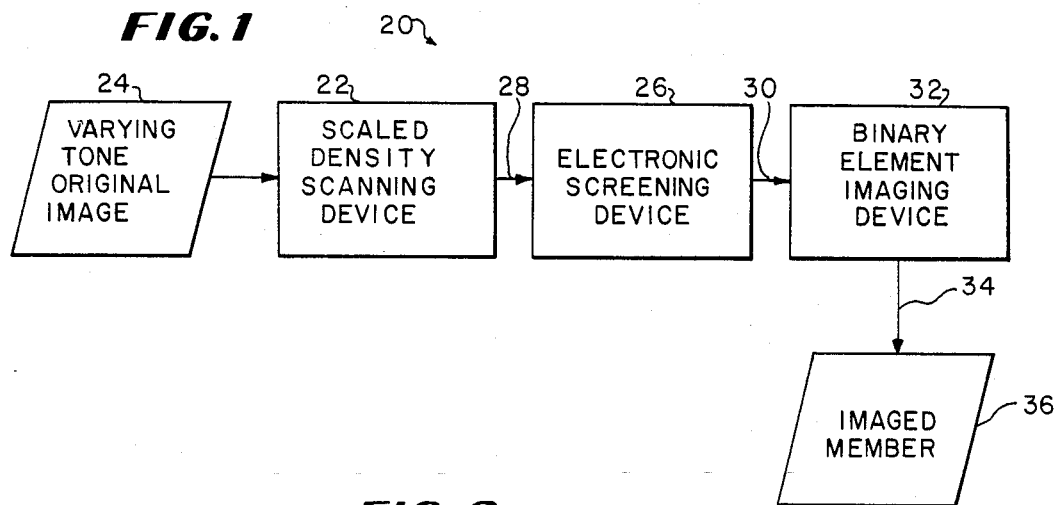
FIG. 1 is a schematic block diagram of the scanning, electronic screening and imaging system of the invention.

The invention best will be understood by considering that an original image of varying tones is to be reproduced using an electronic half-tone screening process and apparatus.

The term "varying-tone" is intended to encompass all images other than text that have gradients of density forming the image. In black and white the varying tone would be represented by tones smoothly progressing from black to white. In color, the varying tone would be represented by a smoothly progressing color wheel. The term "varying tone" includes continuous tone and half-tone images and further includes images that have sharp edges between tones.

Such an original image is reproduced in accordance with the invention by forming an array of binary elements on an imagable member, such as an electrophotographic member. The binary element formed represent the varying tones of the original image and a screen function so that the original image may be reproduced in a printing press using the half-tone process.

For black and white, one array of binary elements on one member is formed to provide one printing plate. For color, usually at least four arrays on individual members are formed to provide four printing plates, the printed arrays being overlaid on one another on a receptor such as paper to form the half-tone reproduction of the original image.

The original image will have been scanned by some other apparatus to provide the electronic screening apparatus of the invention with scaled density information data representing the varying tone of the original image. Each datum will represent the scaled density value of the tone of one incremental area of the original image while the data is ordered in some fashion such as by sequential data representing the tone of sequential incremental areas.

For black and white, one set of scaled density information data is provided while several sets are provided for multi-color images, one set for each color.

Typically, the data is devoid of all screen information, the data having been derived by scanning the original image in one pass of an orthogonal pattern. The method and apparatus introduce the screen frequency and angle information into the density data independent of the density data. The frequency is variable, in the preferred embodiment, from 56.25 to 450 lines per inch and the angle is infinitely variable.

The screen information is provided by establishing a screen matrix of data values referred to as the screen matrix information data. The screen data is formed of 1024 values arranged in 32 rows by 32 columns. The range of values may be from 0 through 255. The values range from the largest to the smallest scaled density value that may be contained in the scaled density information data. The values are ordered with the most dense values or greatest absolute values located in the four corners of the matrix and the least dense or least absolute value located in the center of the matrix. There is a smooth progression of values between the corners and center of the matrix. Other ranges of matrix values and locations may be provided as desired to obtain special screen effects.

During screen processing, the matrix is treated as an orthogonally arranged square. In effect, imaginary lines related to the desired screen angle by simple trigonometric functions are established passing through the square matrix. Values of the matrix that occur at intervals along the imaginary lines are selected and compared to data of the scaled density information and binary data is produced based upon the density data values being not less than the screen matrix data values. A density datum being greater than or equal to a matrix datum produces a binary signal of one sense while a density datum being less than the matrix datum produces a binary signal of the other sense.

In actuality, a row and column starting point is established and row and column increments are established by simple trigonometric functions related to the desired screen angle. The matrix then is stepped through at those increments to obtain matrix values that are compared to the density data. The frequency of the screen is determined by the number of values selected from the matrix in passing once through the screen matrix information data.

Each comparison of density and matrix data is used to produce one binary element information datum that in turn is used to form one binary element on an imageable member. The binary elements are arranged in an orthogonal array on the member and are binarily formable.

In the preferred embodiment, twelve comparators are arranged in parallel for performing the density and matrix data comparisons. The output of each comparator is coupled to a ray of radiant energy that when formed discharges an incremental area on the image member or charged electrophotographic member or when not formed leaves the same area charged. A binary datum of one sense forms the ray and the binary element while a binary datum of the other sense does not form the ray and the binary element.

Two rows of density data are imaged simultaneously. The bottom row of density data cdntrols the first six comparators and rays while the top row controls the last six comparators and rays. Six starting points and increments in the matrix are established for each density datum, one for each comparator and six steps are made in the matrix to obtain six matrix values that are compared to each density datum in each comparator. Thus, each density datum is compared to thirty-six matrix data obtained from six steps along six imaginary lines passing through the matrix. These thirty-six comparisons produce thirty-six binary data that in turn form thirty-six binary elements arranged in a six by six array on the member.

The corresponding two data in the top and bottom row of density data form a total of seventy-two (thirty six plus thirty-six) binary elements on the member. The six steps through the matrix data may be made in more than one matrix cycle, one matrix cycle or a part of one matrix cycle depending upon the screen frequency desired. Increments that go beyond the screen matrix data edges are wrapped around to the corresponding row and column on the other side of the matrix.

The invention thus provides a method and apparatus for introducing screen information electronically into scaled density information at a desired screen frequency and angle independent of the scaled density information.

The invention finds particular utility when used in conjunction with an electrophotographic member formed of a conductive substrate carrying a photoconductive layer or coating described in U.S. Pat. No. 4,025,339 to Kuehnle. That layer provides for the formation of elements that are finer than previously known. Of course, the method and apparatus will find utility whenever and wherever screen frequency and angle information need to be introduced into density data.

In the preferred embodiment of the invention, the latent binary electrostatic image is toned and fused to the member to produce a printing plate that may be used in a lithographic printing press after processing to render toned areas hydrophobic and untoned areas hydrophilic. The hydrophobic areas will carry ink to the receptor such as paper while the hydrophilic areas will print clear.

In the preferred embodiment the setting of starting points and increments of the matrix, comparisons and stepping through of density data is implemented in a microprocessor system while the screen matrix data are contained in a random access memory (RAM) circuit. Implementation in discrete logic would result in comparable system speed but would require about three times the number of circuit packages as for the micro processor system.

The four sets of density data, one set for each color, are imaged on one imageable member, one in each of the four quadrants thereof. The rays are swept across the entire width of the member to image one set of density data on one side of the member during about the first half of the sweep and to image another set of density data on the other side of the member during about the second half of the sweep. Screen continuity from sweep to sweep for each set of density data is maintained merely by saving the contents of screen matrix address registers and reusing the stored contents on the next sweep. Note that each set of density data will use its own separate screen angle, it representing a separate color separation, while all four sets will use one frequency.

Referring now to FIG. 1, there is illustrated a scanning and imaging system indicated generally by the reference character 20. Scanning and imaging system 20 comprises a scaled density scanning device 22 for scanning a varying tone original image 24. The output of scanning device or scanner 22 in the form of scaled density information data is applied to electronic screening device 26 via leads 28. Screening device 26 introduces screen frequency and angle information into the scaled density information from scanner 22. The output of screening device 26 is in the form of binary element information data and is applied via leads 30 to binary element imaging device 32. The output of imaging device 32 is in the form of rays of radiant energy 34 that are used to form imaged member 36.

Imaged member 36 may be any imageable member and in the preferred embodiment is an electrophotographic member having the photoconductive coating described and claimed in U.S. Pat. No. 4,025,339. The member 36 is charged, imaged by the rays 34, toned, fused and processed respectively to render toned and untoned areas hydrophobic and hydrophilic to produce a printing plate ready for use in such as a lithographic printing press.

Figure 2:
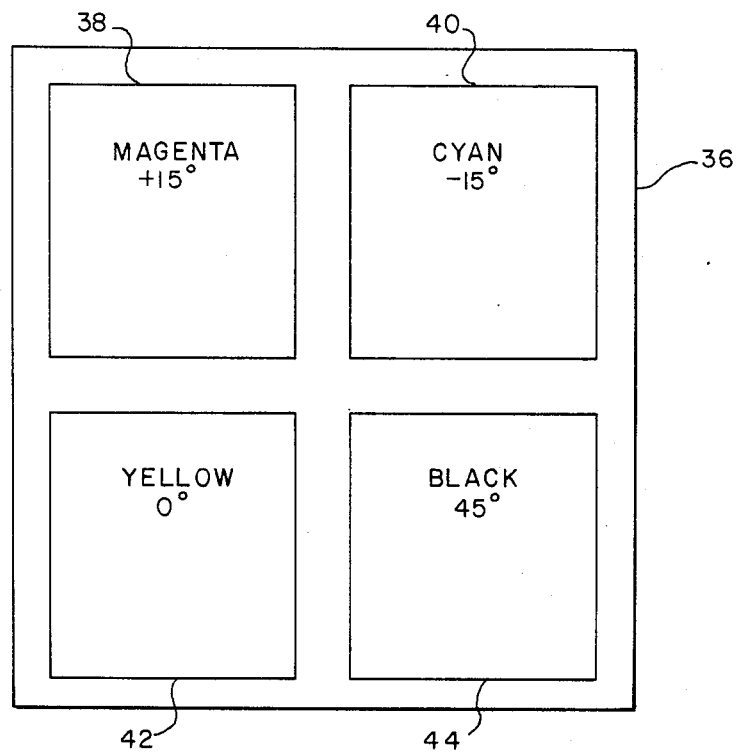
FIG. 2 is a plan view of a member imaged to produce four printing plates thereon, one for each of the color separations of magenta, cyan, yellow and black to be printed to reproduce a varying-tone original image.

In FIG. 2, member 36 is shown to be a generally rectangular member carrying on it or having formed on it four printing plates 38, 40, 42 and 44, one in each of the four quadrants of the member. Plate 38 is formed for printing the color magenta, and has a screen angle of $+15°$. Plate 40 is formed for printing the color cyan and has a screen angle of $-15°$. Plate 42 is formed for printing the color yellow and has a screen angle of $0°$ and plate 44 is formed for printing black and has a screen angle of $+45°$.

The four plates 38, 40, 42 and 44 form the four color separation plates for the varying tone original image 24.

They are formed of arrays of varying numbers of equal area dots formed at orthogonal locations across their fields. The orthogonal locations of the dots of each plate are angled to the locations of the dots of each other and to the dots of the color yellow at the angles of +15°, −15°, +45° as is indicated.

In use, after the four plates are formed they are separated one from another and mounted in such as a lithographic printing press where they are used to print the colors indicated on a receptor such as paper. Suitable registration means such as pinhole alignments, are provided so that the color separation image printed by each plate is aligned properly with the other printed color separation images.

A feature or achievement of the invention is that all four plates 38, 40, 42 and 44 are imaged in one pass of the imaging rays 34 across the member 36 in a pattern of rectilinear, sequential imaging lines. The plates are not separately imaged but rather the entire surface of the member 36 is imaged in one pass with the scaled density data for each separation being applied to the screening device 26 at the proper time for imaging to proceed without interruption. Another achievement of the invention is that the screening device 26 is fast enough to provide imaging device 32 with binary element data for imaging to proceed without interruption.

Figure 3:
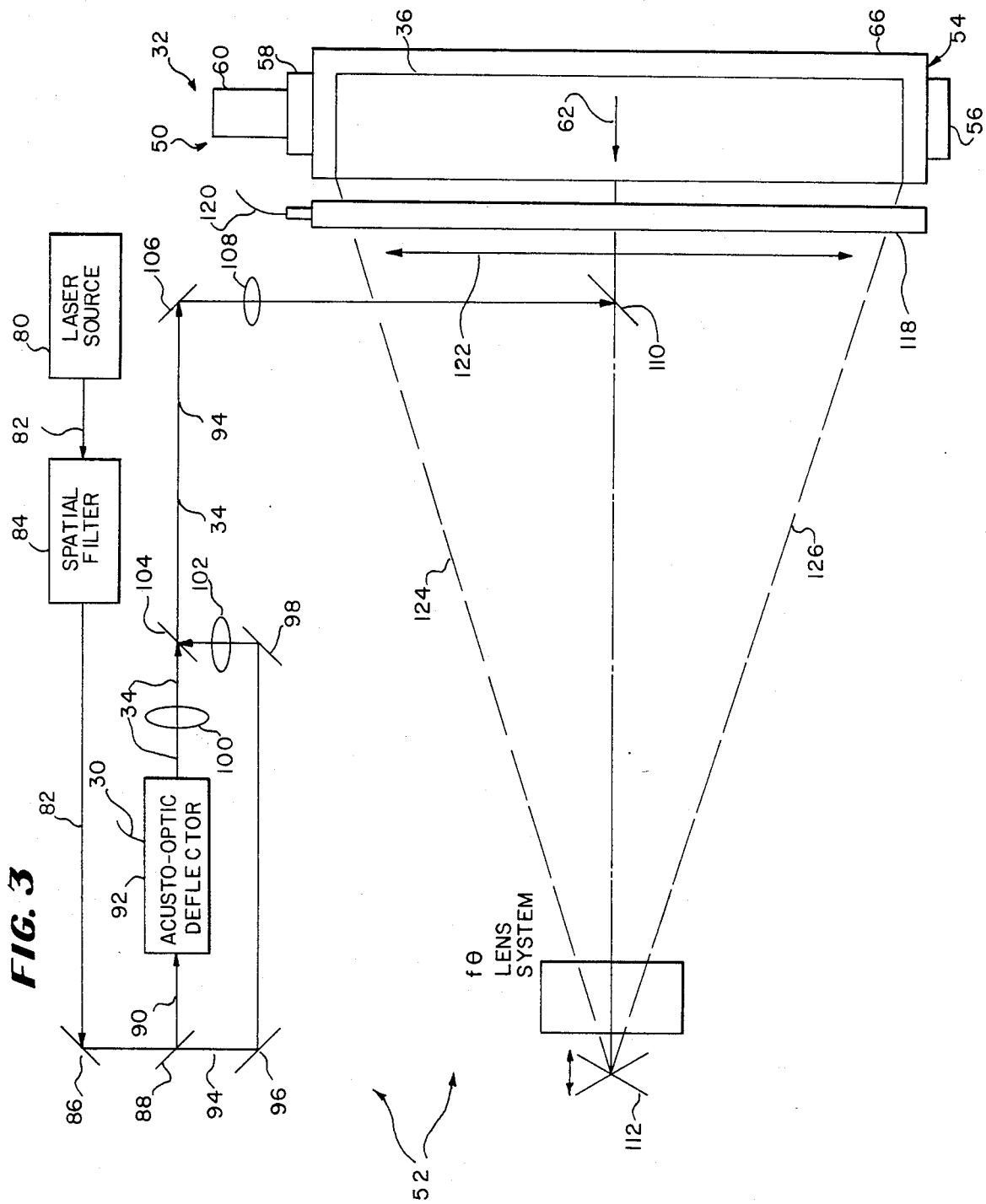
FIG. 3 is a schematic block diagram in plan view of an imaging apparatus used in conjunction with the invention.
Figure 4:
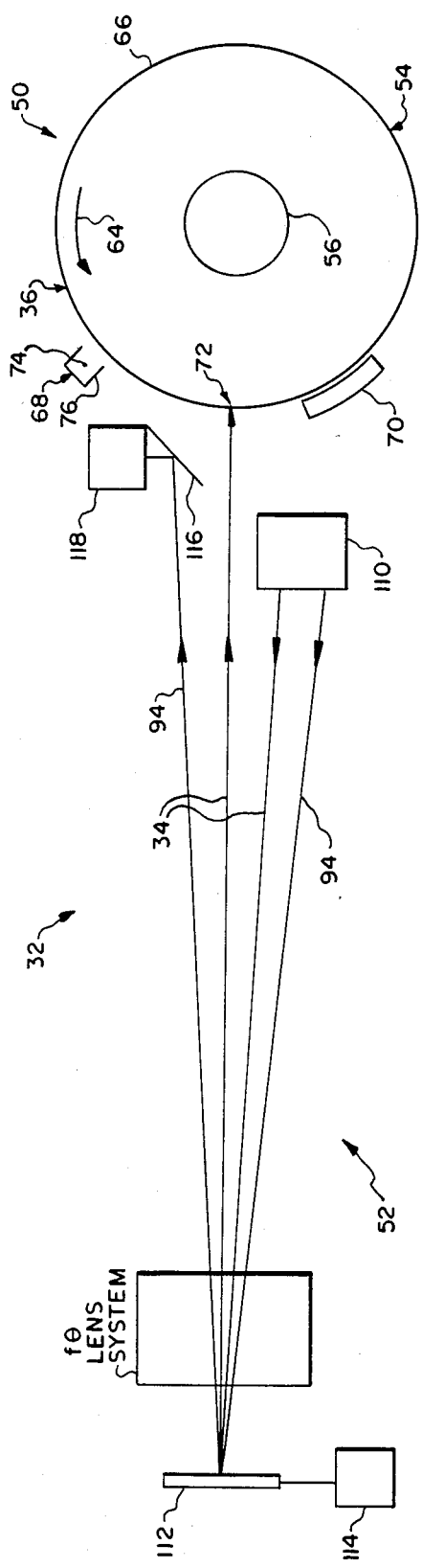
FIG. 4 is a elevational view of a portion of the imaging apparatus illustrated in FIG. 3.

In FIGS. 3 and 4, the binary element imaging device 32 includes a drum assembly 50 for carrying member 36 during charging, imaging and toning and an optical system 52 for forming the imaging rays 34 from the binary element information data and projecting them onto the member 36.

Drum assembly 50 includes an elongate cylindrical drum 54 mounted for rotation on bearings 56, 58 and being driven by motor 60. Motor 60 may be such as a stepping motor and drives drum 54 in rotation a sufficient angular distance at a time for imaging of twelve rays of light energy. Motor 60 drives drum 54 in the direction indicated by arrows 62, 64.

Drum 56 carries member 36 on its outer circumference or surface 66 by suitable retaining means (not shown) carried on the surface 66 or imbedded thereunder. The retaining means may be such as magnetic strips imbedded under surface 66 if the substrate of the member is magnetic or may comprise a vacuum system, springs or clamps as may be desired. The main requirements for such retaining means are that they retain the member 36 in fixed position on drum 54 and that member 36 readily may be mounted on and removed from drum 54.

Drum assembly 50 further includes a charging means 68 and toning means 70 arranged above and below an imaging station 72. In sequence, member 36 is carried past charging means 68, imaging station 72 and toning means 70.

Charging means 68 are for providing an electrostatic charge on the surface of the photoconductive layer of electrophotographic member 36. Charging means 68 may comprise such as a charging wire 74 carrying high voltage, low current electrical power and a conductive channel part 76 for reflecting the electrostatic charge onto member 36.

Imaging station 72 is the area longitudinal of drum surface 66 at which the twelve possible rays of imaging rays 34 impinge on member 36 as it is carried thereby. It should be located so that the rays 34 substantially are radial of drum 54 to avoid the elements becoming oblong due to the curvature of the drum 54. At imaging station 72 the rays 34 selectively discharge and leave charged incremental areas of the member 36 to form an electrostatic image thereon that will form the four plates 38, 40, 42 and 44. This occurs in response to the binary element data produced by screening device 26.

Toning means 70 are for applying finely divided toner particles to the imaged member 36 to develop or make visible the latent electrostatic image carried thereon. In one type of toning system, the toner particles are attracted by the charged areas while the uncharged areas remain untoned. In the reverse system, the uncharged areas are toned while the charged areas repel the toner particles. The preferred embodiment uses the former system.

In optical system 52, a source of radiant energy such as a laser source 80 provides a monochromatic beam 82 of radiant energy that is passed through a spatial filter 84 to shape the beam with a desired cross-sectional configuration that in the preferred embodiment is circular. This provides circular binary elements on the member 36. Beam 82 is deflected by a folding mirror 86 to a half-silvered mirror 88 that reflects a portion 90 of the radiant energy to acousto-optic deflector 92 while transmitting the remaining portion 94 to folding mirrors 96, 98. The portion 90 will be modulated to form the rays 34 while the portion 94 will be used for sensing the position of the rays 34 along the length of imaging station 72.

Acousto optic deflector 92 receives the binary element information data from screening device 26 on leads 30. In response thereto deflector 92 deflects or does not deflect individual ones of the rays 34. At various times all twelve rays may be deflected or formed, no rays may be deflected or formed or some number of rays between twelve and zero may be deflected or formed. Deflector 92 operates on known principles to form the individual rays so that at imaging station 72 the rays will be arranged to just overlap one another as will be described later.

Rays 34 exit deflector 92 and pass through a spot forming lens 100. Beam portion 94 is deflected by mirror 98 through spot forming lens 102 and is deflected by folding mirror 104 arranged below rays 34. After beam portion 94 is deflected by mirror 104, portion 94 and rays 34 remain in vertical alignment through the remainder of the optical system. Beam portion 94 thus may be sensed to determine the longitudinal position of rays 34 along image station 72. Rays 34 and beam portion 94 are then deflected by folding mirror 106 through transmitting lens 108 to folding mirror 110.

Rays 34 and beam portion 94 are then deflected through an $f\ominus$ lens system to a reciprocating galvanometer mirror 112 that is driven by a galvanometric means 114. Galvanometer mirror 12 provides the deflection of rays 34 across each image line at the imaging station 72 and is freely reciprocating.

Rays 34 and beam portion 94 then are reflected back through the $f\ominus$ lens system, which provides for equal distances between the steps of the binary elements on the member 36. Rays 34 are transmitted to imaging station 72 where they impinge on the charged surface of member 36 to image the same. Beam portion 94 is positioned above rays 34 and is transmitted to folding mirror 116 and position sensing means 118. Sensing means 118 provide a signal or signals on lead 120 indicative of the position of beam portion 94 and because of its vertical alignment with rays 34, the longitudinal position of rays 34.

Rays 34 and beam portion 94 are deflected in reciprocal motion across the length of drum 54, as is indicated by arrow 22 by galvanometer mirror 112. The angular extent of the deflections from a centerline are indicated by dashed lines 124, 126.

The binary element information data carried by leads 30 is in the form of summed RF signals. These are provided by the screening device 26 but may be provided by an intermediate device as desired.

Figure 5:
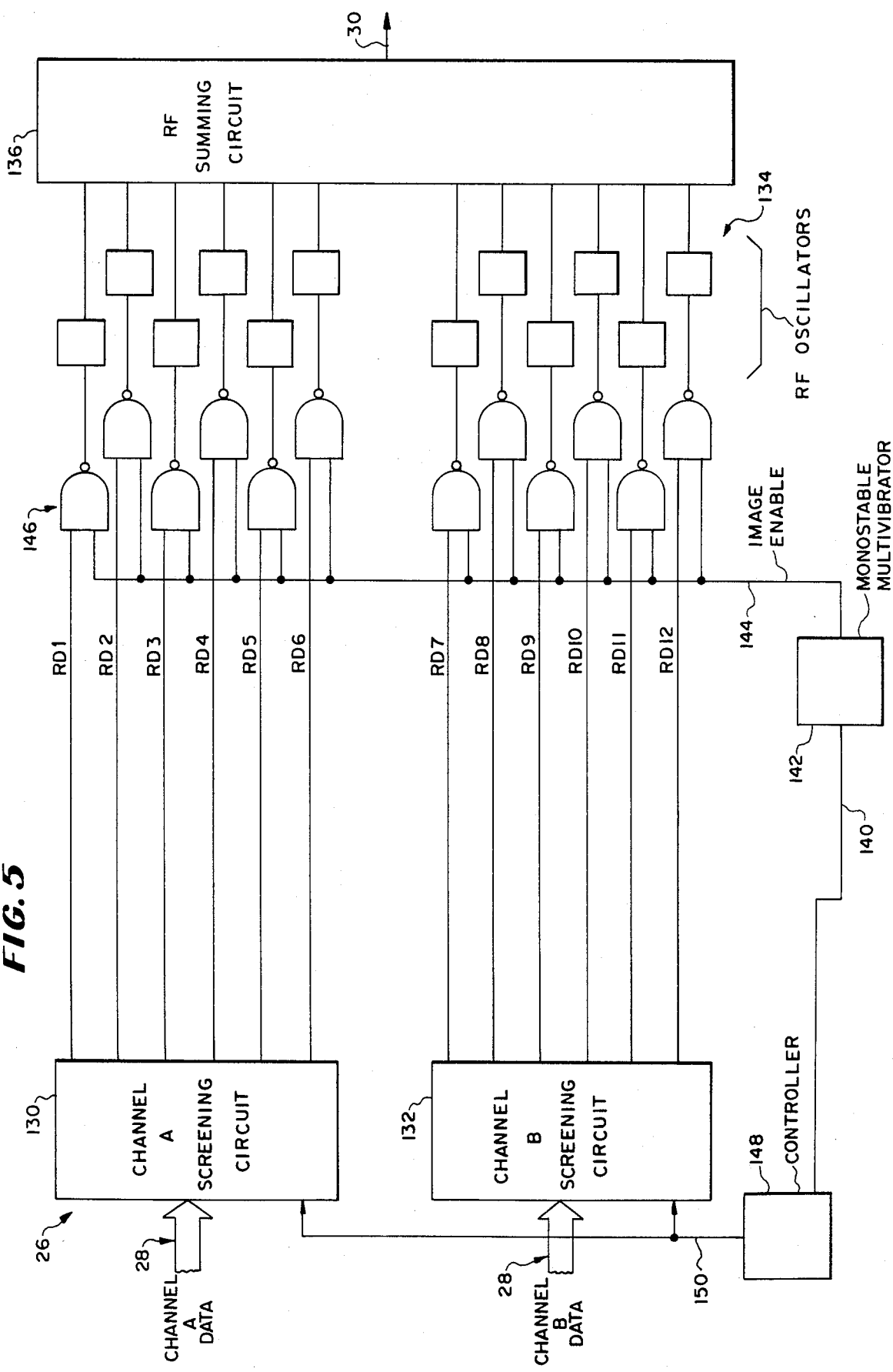
FIG. 5 is a schematic block diagram of a portion of the screening circuit of the invention.

In FIG. 5, screening device 26 receives scaled density information on leads 28 and provides summed RF signals on leads 30. Device 26 provides the signals on leads 30 by operating in parallel on a pair of channels of density data. These channels will be referred to as "A channel" and "B channel" and a description of one channel will be understood to be a description of the other channel. Each channel receives one line of scanned scaled density information data, i.e. the A channel would receive all odd numbered scan line density data while the B channel would receive all even numbered scan line data. The density data arepresented to the pair of channels so that data from scanned incremental areas directly above and below one another are presented simultaneously.

The screening circuit of each channel produces six parallel ray data signals with the channel A circuit 130 producing ray data signals on leads RD1-RD6 and the channel B circuit 132 producing ray data signals on leads RD7-RD12. Each channel A and B circuit thus produces six parallel ray data signals from each density datum as was described earlier. As will be described more fully later, each screening circuit produces six ray data signals on each ray data lead in response to one density datum so that each density datum is used to produce a total of thirty-six ray data signals (six leads times six signals per lead).

The ray data signals on leads RD1-RD12 are binary in form and are formed in parallel. Each ray data lead is gated to its ow radio frequency (RF) oscillator of RF oscillators 134 that is turned on or off in response to the binary state of the gated signal applied thereto. The output of each RF oscillator is applied to a RF summing circuit 136 that operates on known principles to pass the summed RF signals to leads 30 and the acousto-optic deflector 92.

The outputs from the screening circuits thus are used to form the binary elements on the member 36 without any timing restraints, except as is explained next.

Monostable 142 triggers on a signal derived from the system clock carried on lead 140 from the controller 148, and outputs a binary 1 signal pulse known as IMAGE ENABLE on lead 144 that has a certain duration. This signal pulse is applied to the inputs of NAND gates 146 to enable the ray data signals on leads RD1-RD12 to pass to their respective RF oscillators. The purpose of the signal IMAGE ENABLE is to pass the ray data signals, if any, to the RF oscillators for only a certain, short period of time so that the binary elements formed thereby will not be skewed on the member 36. Without this timing signal the binary elements would be skewed or elongated along the length of an image line.

Screening circuits 130, 132 receive the density data under control of controller 148 on leads 150. Controller 148 instructs the screening circuits to receive data and produce the sequence of ray data signals in conjunction with the beam position signals carried on leads 120 from the position sensing means 118. This will be further explained later.

Before the screening circuits 130, 132 are described, it is beneficial to describe the arrays of elements that are formed on the member 36 to create the plates 38, 40, 42 and 44.

Member 36 in the preferred embodiment is a generally rectangular sheet of material comprising a conductive substrate carrying a photoconductive layer or coating that is described and claimed in U.S. Pat. No. 4,025,339. The disclosure of that patent is incorporated herein by reference. That layer or coating is capabl of having formed thereon binary elements that are exceptionally fine. The method and apparatus of the invention may also be used with other types of members, the invention not being limited by or to the member of the preferred embodiment.

Member 36 thus provides a broad field of uniform characteristics upon which fine elements may be formed using electrophotographic techniques of charging, light imaging, toning and fixing or transferring.

Figure 6:
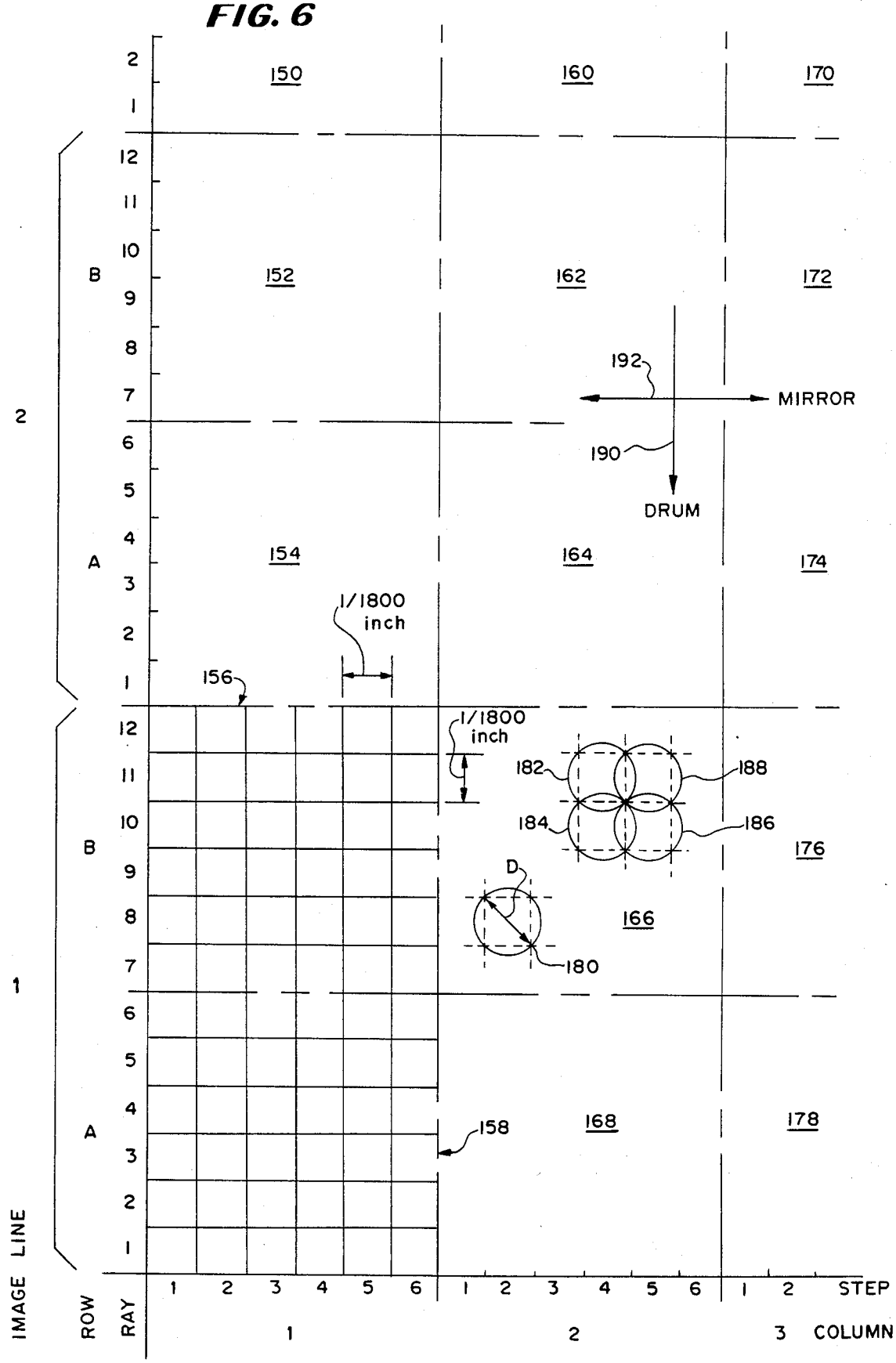
FIG. 6 is a chart illustrating the arrangement of binary elements in incremental areas along the ordinate and abscissa of a Cartesian coordinate system.

FIG. 6 illustrates a portion of the field of member 36 at which the image of one of the plates 38, 40, 42 or 44 will be formed and, in particular, illustrates the beginning corner of one of those plates without any screen angle indicated thereon. Member 36 is devoid of all lines as it is imaged and the use of lines, whether solid or dashed, is purely for explanatory purposes and are not scribed on member 36.

Image picture elements or pixels 150-178 are arranged orthogonally on a Cartesian coordinate system. The ordinate is image lines, there being an A row and a B row of pixels in each image line. There are twelve rays 1-12 in each image line with the rays being divided between the two rows A and B in the same way that ray data signals are divided between channels A and B in FIG. 5. The abscissa is columns, there being six steps in each column.

The ray indications along the ordinate correspond to the ray indications from the screen circuits. Thus, the series of ray data signals produced on lead RD1 will be used to image or form binary elements along ray indication 1 on member 36. In a like manner, the other ray data signals will be used to image binary elements along the other ray indications of the ordinate of FIG. 6.

The six step indications across the width of each column correspond to the six ray data signals that are produced on each ray data lead from one scaled density information datum.

The intersection of one ray indication and one step is an imageable incremental area at which one binary element may or may not be formed. Thirty-six such incremental areas correspond to the thirty-six binary elements that may be formed from one density datum as was discussed earlier.

The incremental areas are square and are arranged with their corners adjacent to three other corners. They are arranged parallel to the ordinate and abscissa and they are outlined in pixels 156 and 158 by rectilinear lines extending perpendicular from the ordinate and abscissa separating the ray and step indications.

In other words, each pixel is comprised of thirty-six image incremental areas arranged six rays high by six steps wide. The ray indications 1-12 correspond to the ray data leads RD1-RD12 from the screening circuit A of FIG. 5 while the steps 1-6 correspond to the six ray data signals produced on each lead from one density datum.

The pixels are arranged in rows and columns, there being two rows of pixels for each sweep of the rays 34 along an image line. The density data from the two scanned incremental areas that are above and below one another are used to form binary elements in two image pixels in one column.

The primary reason for this is that in the preferred embodiment the acousto-optic deflector 92 is capable of deflecting twelve rays 34 at one time. In arranging the size and spacing of the binary elements it was decided to be most advantageous to use six rays to image each line of scan data. With twelve rays available, two scan lines of density data could be screened and imaged in parallel, doubling the speed of the system. Other configurations can be used as desired. For example, one scan line of density data could be used to image a 144 (12×12) incremental area pixel, but then the size of each incremental area would have to be reduced to avoid scale problems between the original image and the reproduction.

In the preferred embodiment, there are 1800 image incremental areas per inch or each incremental area is 1/1800 of an inch in width and height. This is indicated in pixel 156.

The binary elements are formed at each image incremental area by directing thereon a ray having a discrete quantity of radiant energy. The radiant energy causes the photoconductive layer to conduct in that area and discharge the same. Imaging occurs in a sealed cabinet so that only the rays 34 discharge areas of the charged member 36.

A binary element 180 is represented in pixel 166 by a circle having a diameter D that extends from corner to opposite corner of the incremental image area. The diameter of the binary elements is chosen so that when all elements are formed, the surface of member 36 completely will be discharged and will accept no toner particles. If the diameter D is chosen less than this distance, forming all elements would not clear the plate.

The formation of binary elements 182-188 illustrates the discharging of the entire area thereunder. The circles representing the elements touch or overlap leaving no space therebetween.

The ordinate and abscissa of the coordinate system are formed by the rotation of the drum indicated by arrow 190 and the deflection of the galvanometer mirror indicated by arrow 192. The member 36 thus, may be mounted on the drum in imperfect relationship to the coordinate system described and properly aligned plates 38-44 always will result.

Formation of the screened images in each of plates 38-44 occurs by forming certain ones of the binary elements and not forming others of the binary elements in patterns that represent the corresponding scaled density and desired screen angle and frequency. One datum of scaled density information always is used to image one image pixel such as pixels 150-178. The patterns of binary elements that are formed may be over the period of less than one image pixel, over exactly one pixel over several pixels or parts of several pixels.

As in manual half-tone processing, the centers of the patterns formed in conjunction with the invention herein are arranged orthogonal to one another with the lines connecting the centers of the patterns being angled to the coordinate reference system at the desired screen angle and the centers of the patterns occurring at distances from one another at the desired screen frequency. Density at any one pattern is determined by the area around that centering point that is to be printed or not printed. The maximum density that is to be printed with any one pattern is provided by forming binary elements that will form printing areas over the entire domain of one screen period allotted to that pattern, i.e. within the outer limits of one screen period.

In the following description, the limits of each screen period (1/frequency) are described by lines overlaid on the coordinate system used to described the image pixels and binary elements of FIG. 6. For clarity of the figures, only two image pixels 156, 158 are outlined in dashed lines and no incremental areas of binary elements are specifically illustrated.

Figure 7:
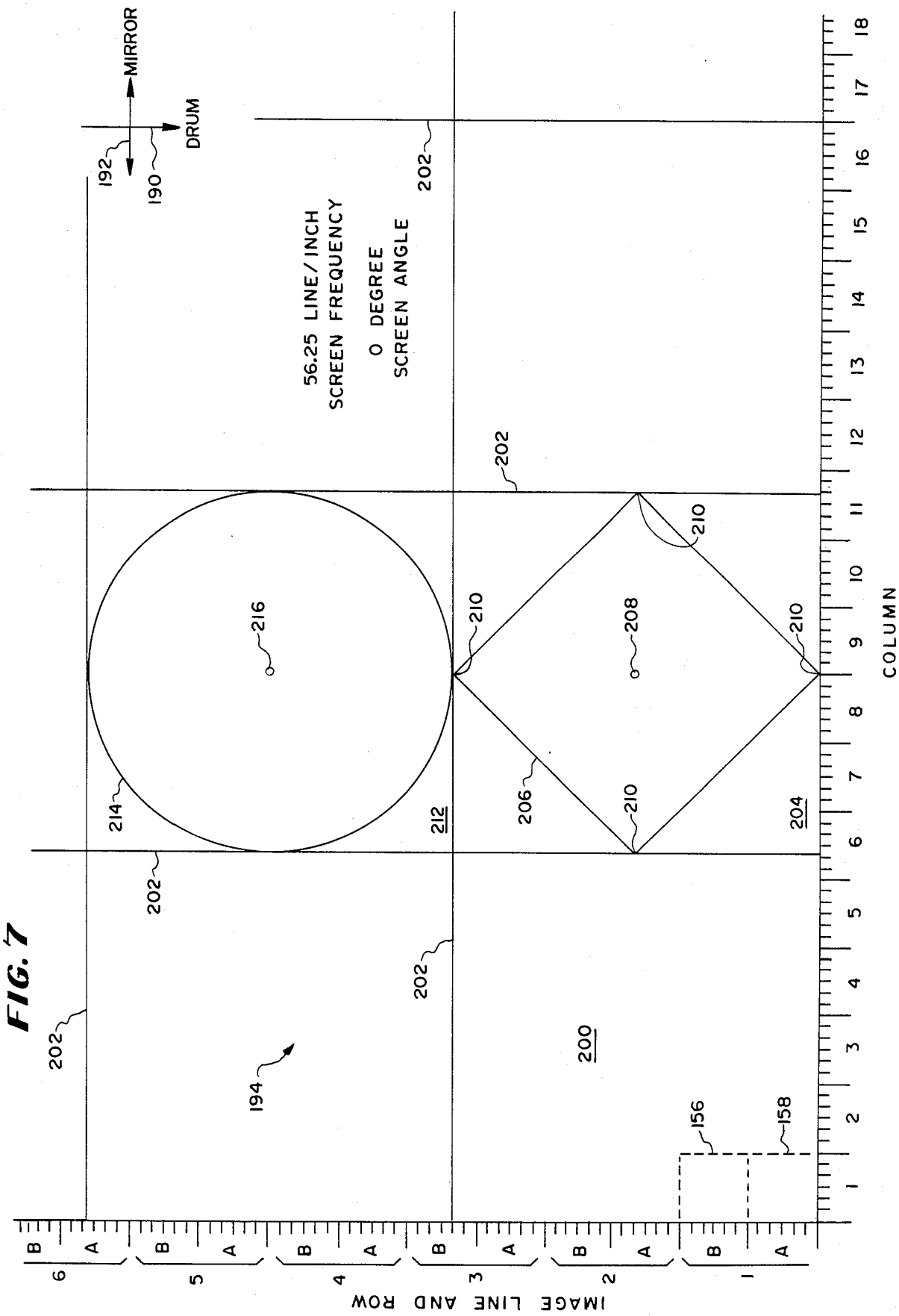
FIG. 7 is a chart illustrating a portion of a half-tone screen having a frequency of 56.25 lines per inch and a 0 degree angle, and further illustrating two types of patterns that may be formed in periods of the screen.

In FIG. 7, a screen 194 has a frequency of 56.25 lines per inch and an angle of 0 degrees. Each screen period such as 200 is outlined by horizontal and vertical lines 202. Each screen period such as 200 occurs over 5 columns and two steps along the abscissa and over two image lines, row A and two rays of row B along the ordinate. In other terms, each period 200 occurs over 32 rays by 32 steps. As will be described, this is the largest period available with the preferred embodiment of the invention. Other larger periods are available upon modification of the preferred embodiment characteristics, but generally are not used in printing processes.

The period defining lines 202 are at an angle of 0 degrees to the coordinate system. Every period such as 200 will have formed within its limits or in its domain, a pattern of binary elements clustered at the center of the period and extending outward therefrom.

In period 204 a diamond-shaped pattern 206 extends outward from centering point 208 of period 204. Pattern 206 is sized to have its corners 210 just touching the lines 202 defining the period 204 and at this size, pattern 206 represents a scaled density of about 50%. Within the boundaries of pattern 206, printing elements will be formed to cover the entire area of pattern 206 while outside of pattern 206 but within the remainder of period 204, no printing elements will be formed.

In period 212 a circular pattern 214 extends outwardly from centering point 216. Pattern 214 is sized to have its circumference just touching the lines 202 defining the period 212 and at this size pattern 212 represents a scaled density of about 78%, i.e. pattern 212 occupies about 78% of period 212. Again, all printing elements within pattern 214 will be formed and no printing elements will be formed outside of pattern 214 but within the remainder of period 212.

The size of the patterns such as 206 and 214 are varied within the limits of each period to obtain different density values. The configuration of the patterns such as 206 and 214 may be as desired.

Again, the screen frequency is provided by the distance between pattern centers, such as 208, 216, and the screen angle is provided by the angle to the coordinate system of lines passing through the pattern centers. In different terms, the screen frequency is provided by the distance between lines such as 202 separating the screen periods while the screen angle is provided by the angle to the coordinate system of the lines such as 202 separating the screen periods. It can readily be understood that the lines such as 202 are parallel to the lines that would pass through the centers of the patterns or periods. Reference to the lines 202 for both screen frequency and angle avoids reference to two sets of lines for these characteristics.

Figure 8:
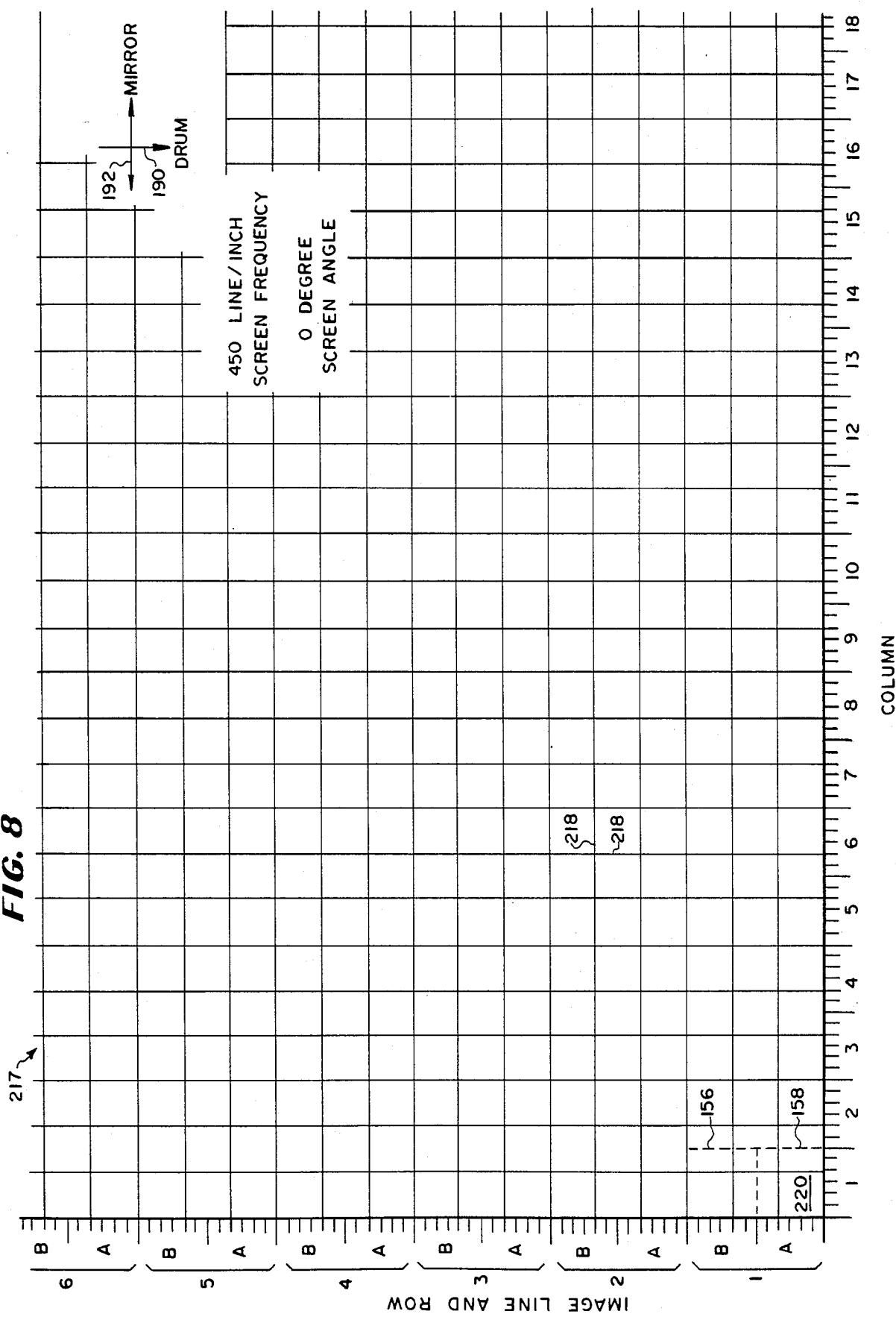
FIG. 8 is a chart illustrating a portion of a half-tone screen having a frequency of 450 lines per inch and a 0 degree angle.

In FIG. 8, a screen 217 has a frequency of 450 lines per inch and an angle of 0 degrees and is described by pattern defining lines 218. Each period such as period 220 extends over four rays by four steps, or a part of one image pixel such as 158. The period defining lines 218 are at an angle of 0° degrees to the coordinate system.

This frequency illustrates the upper limit of screen frequencies available in the preferred embodiment. Higher frequencies are attainable by altering the characteristics of the preferred embodiment. Again, patterns are formed centered in each period and are of varying size to indicate different scaled density values. The number of density patterns available in each period are limited by the reduced number of binary elements available with which to form such patterns. The configuration of the patterns is as desired.

Figure 9:
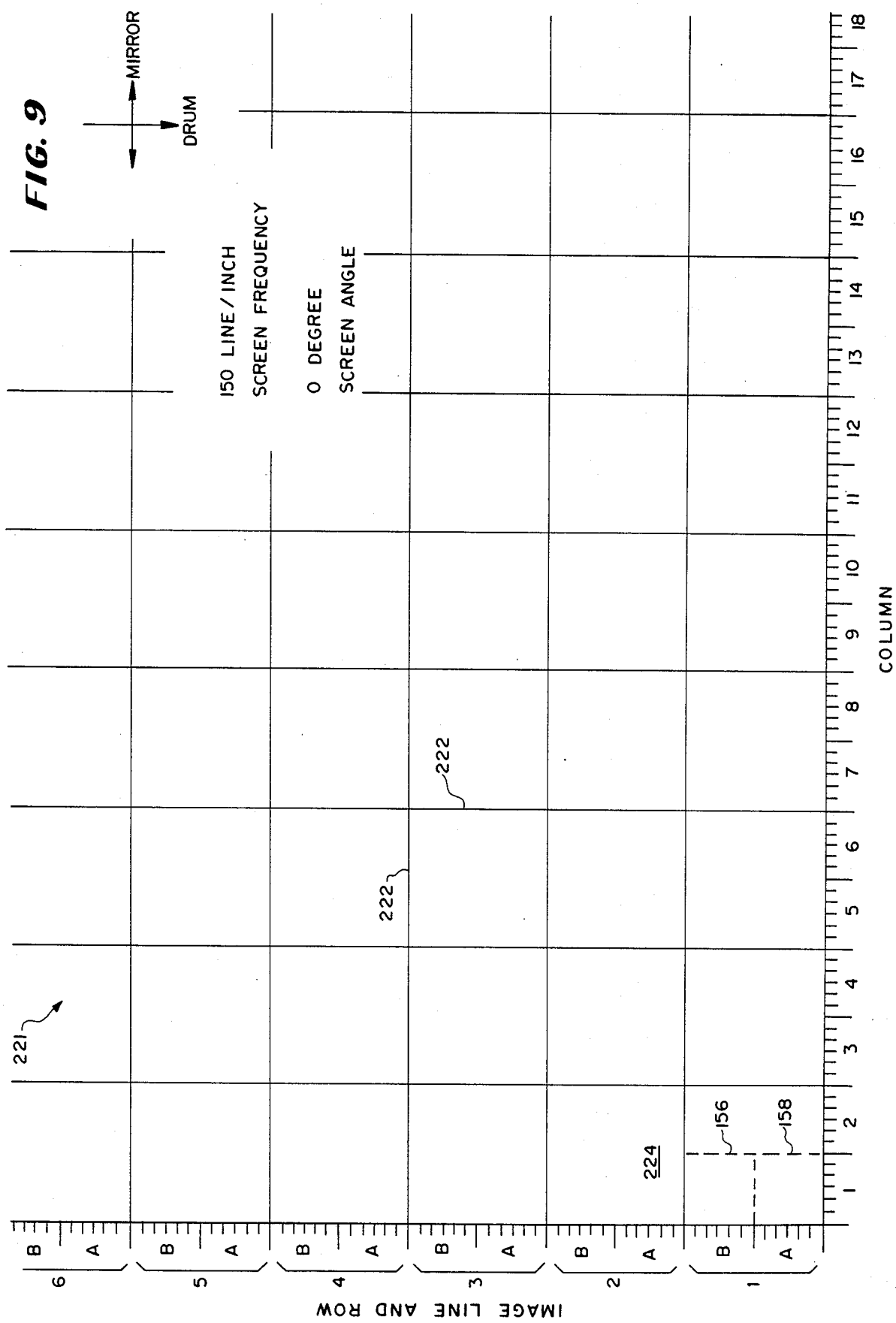
FIG. 9 is a chart illustrating a portion of a half-tone screen having a frequency of 150 lines per inch and a 0 degree screen angle.

In FIG. 9, a screen 221 has a frequency of 150 lines per inch and an angle of 0 degrees and is described by pattern defining lines 222. Each period such as period 224 encompasses four image pixels and extends over 12 rays by 12 steps, i.e. one image line or two rows by two columns. The period defining lines are at a 0 degree angle to the coordinate system. This frequency screen often is used in lithographic printing. Screen 221 provides the screen angle typically used for printing the color yellow.

Figure 10:
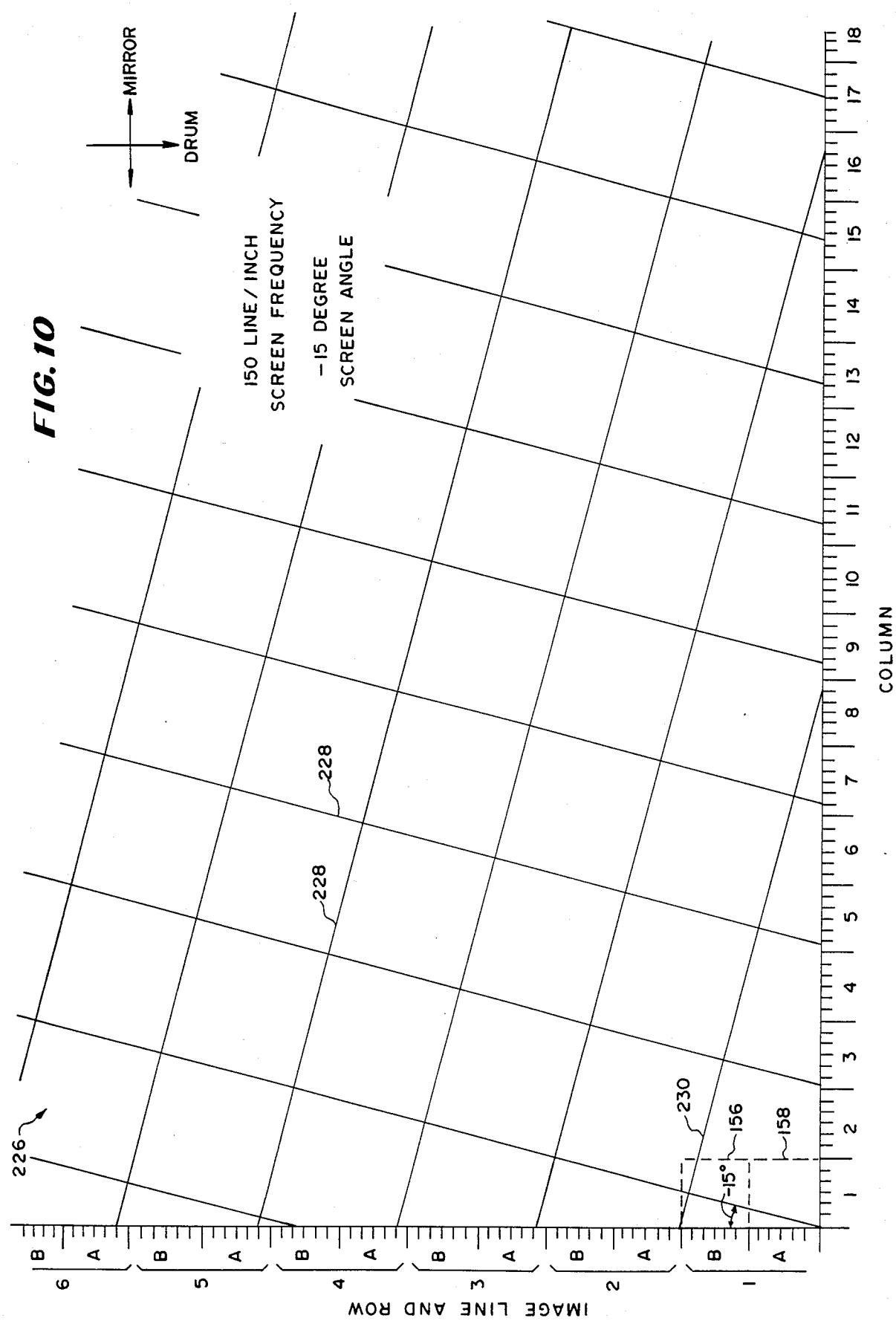
FIG. 10 is a chart illustrating a portion of a half-tone screen having a frequency of 150 lines per inch and a −15 degree screen angle.

In FIG. 10, a screen 226 has a frequency of 150 lines per inch and an angle of −15 degrees relative to the coordinate system. The periods of screen 226 are described by lines 228. The dimensions of each period such as 230 are the same as for screen 221 in FIG. 9. Pixels 156, 158 are within the boundaries of several screen periods including period 230 and adjoining periods.

Screen 226 provides the screen angle typically used for printing the color cyan. It is formed by forming binary elements in the image pixels to form patterns in the periods arranged around or about the period centers.

Figure 11:
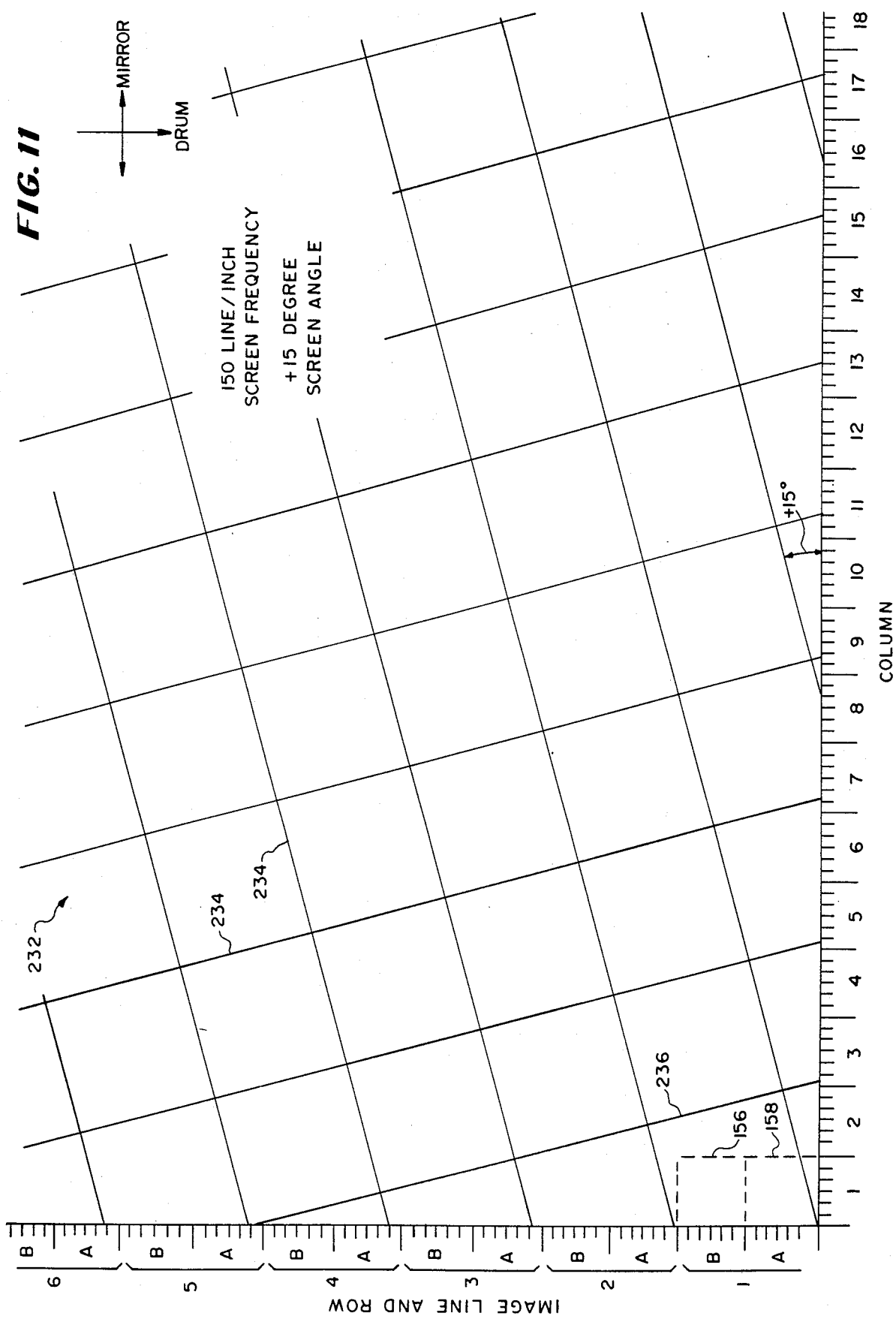
FIG. 11 is a chart illustrating a portion of a half-tone screen having a frequency of 150 lines per inch and a +15 degree screen angle.

In FIG. 11, a screen 232 has a frequency of 150 lines per inch and an angle of +15 degrees. The periods of screen 232 are described by lines 234, and the dimensions of the periods such as 236 are the same as for screen 221 in FIG. 9. The pixels, again may be within the boundaries of several periods such as 236 and adjoining periods. Screen 232 provides the screen angle typically used for printing the color magenta.

In FIG. 12, a screen 238 has a frequency of 150 lines per inch and an angle of +45 degrees. The periods of screen 238 are described by lines 240 and the dimensions of the periods such as 242 are the same as for screen 221 in FIG. 9. The pixels may be completely within the boundaries or domains of the periods or may be bridged across two or more periods. Screen 238 provides the screen angle typically used for printing black ink.

The four screens 221, 226, 232 and 238 that have a frequency of 150 lines per inch typically are used in conjuction with one another to print a full color halftone image. The periods of each screen contain patterns that when printed (all four screens) reproduce the color tones of the varying tone original image.

The densities in each screen are provided by the areal sized patterns formed in the screen periods. The screen frequency is provided by the distances between centers of the periods or patterns, or total areas of the periods and the screen angle is provided by the alignment of the period or pattern centers.

These characteristics are obtained by providing an ordered matrix of screen matrix information data. The scaled density information data then is compared to certain matrix data that are located in positions of the matrix (rows and columns) related to the desired screen frequency and angle. The values at different matrix locations are sampled for different screen frequencies and angles.

In FIGS. 13A and 13B a matrix 250 of screen matrix information data values are arranged in 32 rows and 32 columns. The columns are identified by the X-addresses 1–32 and the rows are identified by the Y-addresses 1–32. There are a total of 1024 addressable locations in the matrix 250 ($32 \times 32 = 1024$) and the values contained at these locations range from 1 to 255 (Base Ten).

The reason for this range of values is that this is the range of values carried in the scaled density information data from the scanner. The matrix data thus may directly be compared to the density data. Further, this range of values is binarily represented by an 8 bit binary digital word that is commonly used in data handling and processing and many electronic circuits are commercially available to implement the use of such data.

The values are arranged in matrix 250 to provide a diamond shaped pattern such as is illustrated at 206 in FIG. 7. The values further are arranged with the values 255, or greatest density at the four corners ($X=1$ and 32, $Y=1$ and 32) with the value 1 representing the least density at the center ($x=16$ and 17, $Y=16$ and 17. The values between 255 and 1 are arranged to obtain smoothly increasing values from the center to the corners.

The values of matrix 250 are stored in a memory device such as READ ONLY MEMORY (ROM) or RANDOM ACCESS MEMORY (RAM) and are accessed by energizing the X and Y address signals corresponding to the desired location. The memory device then outputs the value contained at the selected address location.

Screening of density data according to the invention may most easily be understood by reference to screen 194 in FIG. 7, the matrix 250 of FIGS. 13A and 13B and for this example setting all the density values to 128, or a 50% density value. It will be remembered that the entire surface of member 36 is charged and will solidly print black if certain areas are not discharged to form the desired images. It also will be remembered that screen 194 has periods that are 32 rays by 32 steps. The 0 degree screen angle case will first be explained as it is the easiest to understand.

For screen 194, the 32 ray locations associated with period 200 correspond on a one-to-one basis with the 32 Y-addresses of matrix 250. The 32 step locations associated with period 200 correspond on a one-to-one basis with the 32 X-addresses of matrix 250. As the rays 34 of radiant energy are stepped along the image lines, the matrix values for corresponding ray and step locations are accessed and compared with scaled density data values corresponding to those locations.

Thus, the density value corresponding to the image pixel 158 will be compared in sequence to the matrix values corresponding to the screen locations described by image line 1, row A, rays 1–6 and column 1, steps 1–6. The density value of 128 thus will be compared to the thirty-six matrix values at Y-addresses 1–6, X-addresses 1–6.

The comparisons of values will be performed to obtain binary results based upon the density value being not less than the matrix value. If the density value is less than the matrix value, a binary 1 results and a ray is formed to discharge the corresponding incremental area on the member 36. If the density value is not less than the matrix value, then a binary 0 results and a ray is not formed leaving that corresponding incremental area charged to be toned and print a solid area. The values contained at matrix X, Y addresses 1, 16 and 1, 17 are both 136. The density value 128 is compared to these and results in binary 1's that discharge the incremental areas located in screen 194 at image line 2, row A, ray 4 and 5; column 1, step 1. Moving one step to tne right in screen 194 and matrix 250, the matrix values are now 120. The density value of 128 is compared to these and binary 0's result which leave charged the incremental areas at the same ordinate location but at step 2 on the abscissa.

This is performed across the entire domain of period 200 and the resulting pattern is a diamond-shaped pattern such as 206 formed in period 204.

In other words, the density values corresponding to sequential image pixels along image line 1 are compared to the matrix values located at sequential X-addresses along the first twelve (1-12) Y-addresses to of the matrix 250. When the 32 X-addresses have been accessed, the sequence begins again at the beginning of the X-addresses. This is known as wrap-around. When image line 1 is completed being imaged, then the density values corresponding to the image pixels of image line 2 are compared to matrix values located at sequential X-addresses along the next twelve (13-24) Y-addresses of the matrix. Again, the matrix values are wrapped around from right edge to left edge when the X-addresses are exhausted.

When image line 2 is completed, then the density values corresponding to the image pixels of image line 3 are compared to matrix values located at sequential X-addresses along the next twelve (25-4) Y-addresses of the matrix. Like the X-addresses, the Y-addresses also wrap around, but from bottom to top. The wrapping around of Y- and X-addresses continues across the entire field of each plate 38-44 to form the recurring screen patterns of the indicated screen.

For understanding the other screens described, the stepping through the screen matrix 250 will be described in terms of matrix starting points for each of the rays, and Y and X increments between selected value locations in the matrix 250. These parameters will be known as matrix selection parameters.

In the example just described, the starting point for ray 1 is Y=1 and the X-increment is 1 while the Y-increment is 0. Thus, to form ray 1 on the member 36, matrix values are selected only from along Y address 1. Every other ray starts at its corresponding Y-address and proceeds along that row. In chart form, the matrix selection parameters may be expressed for screen 194 as follows:

| Ray | Starting Point Y = | Y increment | X increment |
|---|---|---|---|
| N | N | 0 | 1 | where N is an integer number from 1 to 32.

For screen 217 illustrated in FIG. 8, the matrix selection parameters are as follows:

| Ray | Starting Point Y = | Y increment | X increment |
|---|---|---|---|
| 1 | 1 | 0 | 8 |
| 2 | 9 | 0 | 8 |
| 3 | 17 | 0 | 8 |
| 4 | 25 | 0 | 8 |
| 5 | 1 | 0 | 8 |
| 6 | 9 | 0 | 8 |
| 7 | 17 | 0 | 8 |
| 8 | 25 | 0 | 8 |
| 9 | 1 | 0 | 8 |
| 10 | 9 | 0 | 8 |
| 11 | 17 | 0 | 8 |
| 12 | 25 | 0 | 8 |

Thus, the higher frequency screen 217 of 450 lines per inch is produced by comparing the density values to fewer matrix values that are spaced further apart from one another at regular intervals of the matrix. This correlates to a high frequency manual screen of lines that has a steep gradient of density values from edge to edge of the screen period. The lower frequency screen of screen 217 correlates to a low frequency manual screen of lines in that it has a lower gradient of density values from edge-to-edge of the screen period.

So far, we have described how the matrix may be stepped through with integer starting points and X-Y increments. Stepping through with fractionally spaced apart starting points and X-Y increments occurs in a similar manner, with the fractional number being rounded off to the next highest or lowest integer.

For example, the matrix selection parameters for screen 221 in FIG. 9 are as follows:

| Ray | Starting Point Intervals | Y Increments | X Increments |
|---|---|---|---|
| N | $2\frac{2}{3}$ | 0 | $2\frac{2}{3}$ | where N is an integer from 1 to 32.

This starting point interval results in actual matrix starting points for each ray of:

| Ray | Starting Point (rounded off,) Y = | Starting Point (Ray 1 plus interval, actual) Y = |
|---|---|---|
| 1 | 1 | 1 |
| 2 | 4 | $3\frac{2}{3}$ |
| 3 | 6 | $6\frac{1}{3}$ |
| 4 | 9 | 9 |
| 5 | 12 | $11\frac{2}{3}$ |
| 6 | 14 | $14\frac{1}{3}$ |
| 7 | 17 | 17 |
| 8 | 20 | $19\frac{2}{3}$ |
| 9 | 22 | $22\frac{1}{3}$ |
| 10 | 25 | 25 |
| 11 | 28 | $27\frac{2}{3}$ |
| 12 | 30 | $30\frac{1}{3}$ |
| 1 | 1 | 33 or 1 |

Because matrix 250 is symmetrical along the Y and X addresses, the steps along the X addresses for all of the rays are the same as the Y addresses for the starting points, or 1, 4, 6, 9, 12, 14, 17, 20, 22, 25, 28 and 30.

The numbers given are for one period of the screens exemplified. These numbers are simply repeated as movement of the rays 34 progresses along the image lines.

Other starting points and increments for 0 degree screens can be calculated by dividing the number of incremental areas along one axis in one screen period into 32 (the number of X or Y addresses available in matrix 250). For screen 194 this calculation is thus:

$$\frac{32 \text{ } (X \text{ or } Y \text{ address in matrix 250})}{32 \text{ (incremental areas along axis)}} = 1 \quad (1)$$

For screen 217 this calculation is thus:

$$32/4 = 8 \quad (2)$$

For screen 221 this calculation is thus:

$$32/12 = 2\tfrac{2}{3} \quad (3)$$

In more general terms, the starting points, SP, and increments INCR may be related to the screen frequency F by a relationship including the 32 address locations along one axis of the screen matrix and the 1800 image incremental areas per inch that may be formed on the member. The relationship is:

$$SP = INCR = F \frac{32 \text{ matrix addresses}}{1800 \text{ image incremental areas per inch}} \quad (4)$$

For all 0 degree (or 90 degree) screen angles, the Y-increment always will be zero and the X-increment always will be some integer or fractional number (or vice versa). For screen angles other than 0 and 90 degrees the Y- and X-increments both will be some non-zero integer or fractional number. The Y- and X-increments will be determined using fundamental trigonometric relationships, remembering that all the screens are orthogonal (forming right angles between their defining lines) and that there is equal spacing between all defining lines. Other non-orthongal screens with unequal spacings are possible through the use of suitable trigonometric relationships.

The trigonometric relationships are applied to the steps or starting point intervals and X-, Y-increments through the matrix 250, not to the incremental areas on the member 34. The incremental areas which are then imaged on member 34 will exhibit an apparent screen angle according to the angle desired.

From simple trigonometry it can be shown that the interval between selected locations in the screen matrix will form a hypotenuse of a right triangle and the Y- and X- address increments describing that interval will form the legs of that triangle so that the X- and Y-increments for describing selected matrix locations for any screen angle $\theta$ will be described by the equations:

$$Y - \text{increment} = \frac{F(32)}{1800} \cdot \sin \theta \quad (5A)$$

$$X \text{ increment} = \frac{F(32)}{1800} \cdot \cos \theta \quad (5B)$$

Thus, for a $-15$ degree screen such as 226 having the interval or increment at 0 degrees of INCR$=2\tfrac{2}{3}$ $$2\tfrac{2}{3} \cdot \sin -15° = (2\tfrac{2}{3}) \cdot (-0.2588) = -0.6901333 = Y\text{-increment} \quad (6)$$

$$2\tfrac{2}{3} \cdot \cos -15° = (2\tfrac{2}{3}) \cdot (+0.9659) = +2.5757322 = X\text{-increment} \quad (7)$$

The $+15$ degree screen 232 having a 0 degree increment of $2\tfrac{2}{3}$ has X- and Y- increments of:

$$2\tfrac{2}{3} \cdot \sin 15° = 0.690133 = Y\text{-increment} \quad (8)$$

$$2\tfrac{2}{3} \cdot \cos 15° = 2.5757322 = X\text{-increment} \quad (9)$$

The 45 degree angle of screen 238 provides X- and Y-increments of:

$$2\tfrac{2}{3} \cdot \sin 45° = 1.8855999 \quad (10)$$

$$2\tfrac{2}{3} \cdot \cos 45° = 1.8855999 \quad (11)$$

Setting the matrix starting points and X- and Y- increments in accordance with these principles, comparing so selected matrix values to sequential density values and imaging binary elements in corresponding incremental areas, then reproduces the color separation at the indicated density with the desired screen frequency and screen angle imposed thereon. Effectively, the screen matrix is mapped onto the imaged member.

Other screen frequencies and angles are obtained by varying the starting point intervals and X-, Y-increments in accordance with the fundamental trigonometric principles and values associated therewith. Again, all decimals are rounded off to the nearest integer with values of 0.5 or greater being rounded up and values of $0.4\overline{9}$ or less being rounded down. As is illustrated in the chart describing the starting point intervals for screen 221, the rounded-off value is not used in calculating the next matrix value location. In effect, the precise location for a matrix value is calculated and then the nearest actual matrix value is selected using the round-off procedure. In this way, the matrix values may be said to be regularly spaced from one another or to be regularly spaced. This regular spacing may not be readily apparent from viewing a chart of selected locations in a screen matrix.

In the hardware to be described presently, this round-off function occurs by starting a matrix location address at a decimal equivalent of 0.5 beyond where it should start and truncating the address actually obtained. This automatically provides the desired round-off function. This method of performing a round-off function is believed to be known.

It will be remembered from the discussion in connection with FIG. 5 that there are two screening circuits, channel A 130 and channel B 132, that produce the binary bits indicating the rays that are to be formed or not formed. It is these two circuits that perform the selection of the screen matrix information data values and compare them to the scaled density information data values in accordance with the principles just described.

Again, the Channel A and Channel B circuits are identical to one another in all respects except for the line density data that they compare to the matrix values. A description of one thus is a description of the other.

Each channel screening circuit 130, 132, in turn, is comprised of six parallel bit-slice operating circuits. Each operating circuit is used to select one screen matrix value from the matrix of values and compare it to the value of the scaled density datum to produce a ray forming binary bit of one sense or the other. This is performed for each step along the abscissa described earlier. Thus, there are a total of twelve of these bit-slice operating circuits to produce the twelve ray controlling bits RD1–R12 of FIG. 5.

A description of one operating circuit is a description of the other eleven because they are identical to one another.

Figure 14:
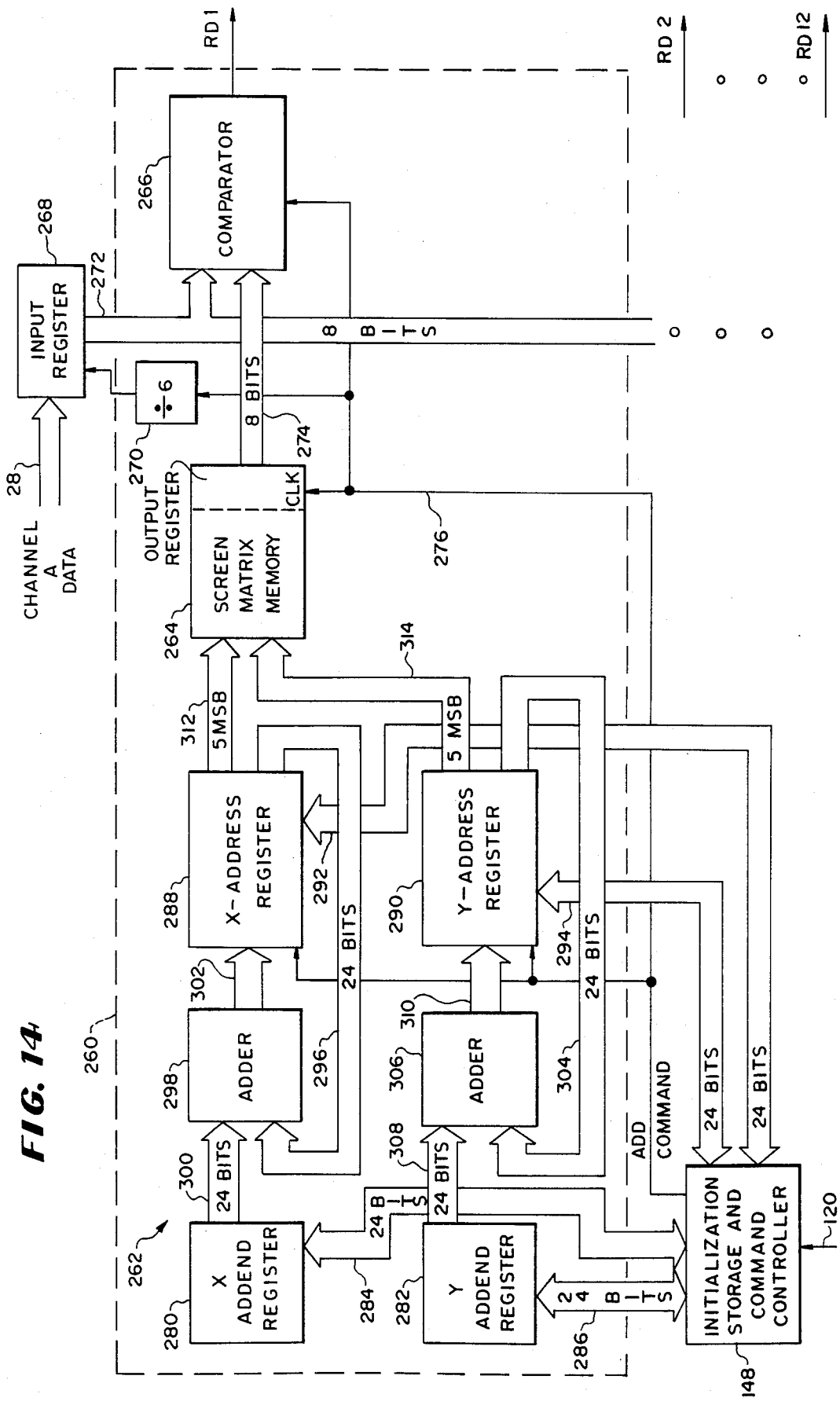
FIG. 14 is a schematic block diagram of one of twelve parallel operating circuits used to screen the scaled density information data and provide the screens illustrated in FIGS. 7-12.

In FIG. 14, operating circuit 260 comprises an address initialization and incrementing portion 262, memory 264 and comparator 266. Multi-bit address and data leads are indicated by wide arrows.

The scaled density information data for channel A is applied to input register 268 one eight bit word at a time under control of divide by six circuit 270. The eight bit output of register 268 is applied in parallel on leads 272 to the comparator 266 and simultaneously to the comparators of the next five operating circuits. The density data from Channel A thus is applied to the comparators of the operating circuits for ray data bits RD1-RD6.

In a like manner, the scaled density data from Channel B is applied to the comparators of the next six operating circuits for ray data bits RD7-RD12. The outputs of the comparator 266 and its counterparts are the ray data bits RD1-RD12 also indicated in FIG. 5.

The eight bit parallel output of screen matrix memory 264 is applied on leads 274 to the comparator 266. The value selected from the matrix of values in memory 264 is held in an output register portion of memory 264 and is valid during an ADD COMMAND signal received on lead 276 from the command portion of controller 148. When the matrix value is valid, the comparator 266, also connected to the ADD COMMAND signal, performs the comparison. Again, the ray data signal is the result of the density value being not less than the matrix value.

The ADD COMMAND signal is formed in timed relationship to the beam location signals on leads 120 from the location sensing means 118 of FIGS. 3 and 4.

The ADD COMMAND signal also is applied to the divide-by-six circuit 270. Circuit 270 clocks the input register to enter a new density value therein on every sixth ADD COMMAND signal. This provides for the six steps of the image pixels or a new density value being used to image every six step image pixel. The term step refers to the step indications marked on the abscissa in FIGS. 7-12.

The address initialization and incrementing portion 262 provides the circuits for setting the starting points in the matrix for each ray and the X- and Y-increments for the X and Y matrix addresses for that ray.

The initialization portion of controller 148 loads X addend register 280 and Y addend register 282 with the X- and Y-increment values via leads 284 and 286. The initialization portion of controller 148 also loads X-address register and Y-address register 290 with the X and Y starting point addresses via leads 292 and 294.

Registers 280, 282, 288 and 290 are 24 bit circuits that input, hold and output 24 parallel binary bit words.

In operation, the output of X-address register 288 is applied via leads 296 to one of the two inputs of adder circuit 298. The output of X-addend register 280 is applied via leads 300 to the other one of the inputs to adder circuit 298.

Adder circuit 298 sums the two numbers applied to its inputs and outputs the sum via leads 302 to the input to X-address register 288. On each ADD COMMAND signal this cycle repeats itself, with the ADD COMMAND signal serving to clock the new address value into register 288.

In a like manner, the output of Y-address register 290 is applied via leads 304 to one of the two inputs of adder circuit 306. The output of Y-addend register 282 is applied via leads 308 to the other input of adder circuit 306.

Adder circuit 306 sums the two numbers applied to its inputs and outputs the sum via leads 310 to the input to the Y-address register 290. This cycle repeats itself on every ADD COMMAND signal with the ADD COMMAND signal serving to clock the new address value into register 290.

The five most significant bits (5 MSB) from X and Y registers 288 and 290 are applied via leads 312 and 314 to memory 264 and serve as the X and Y addresses for selecting matrix values. This automatically performs the desired rounding off.

The disclosed operating circuit thus performs the matrix value selection and comparison to the density value efficiently and at a rate fast enough to accept data directly from a data handling communications network.

The preferred embodiment is implemented in a bit-slice microprocessor such as 2901 commercially available from AMD or National Semiconductor. That device provides several registers that are used for the addends and addresses. Summing may occur under software control. The preferred embodiment may be implemented using discrete circuits and an operating circuit will result that is just as fast as one implemented in a microprocessor, but requiring about three times the number of circuit packages.

Prior to imaging a member 36, the matrix starting points and increments for each ray are established in controller 148 for all four plates 38-44. Prior to the commencement of imaging, the proper starting points and increments for the first plate, such as 42 are loaded into registers 280, 282, 288 and 290 and their counterparts in the other operating circuits. The first image then is imaged in the first plate such as 38, across half of the plate.

At the end of the image line 1 in plate 42, the contents of registers 280, 282, 288 and 290 are saved in storage portion of controller 148 via bidirectional leads 284, 286, 292 and 294 for use in image line 2 of plate 42 and the proper starting points and increments for plate 44 are loaded therein. The second half of image line 1 then is imaged in plate 44.

At the end of image line 1 in plate 44 the contents of registers 280, 282, 288 and 290 from each operating circuit again are saved for use in line 2 of that plate.

At the beginning of line 2 of plate 42 the increment registers 280 and 282 are re-loaded with the stored values. Address registers 288 and 290 are loaded with values equal to the stored values plus an image line increment.

The image line increment is calculated using fundamental trigonometric principles and takes into account the length of the previous image line so that the screen lines such as 228 of FIG. 10 of different image lines match one another.

This process repeats across every image line of all four plates 38-44 to image all four plates in one pass or sweep of rays 34 across member 36.

Figure 15:
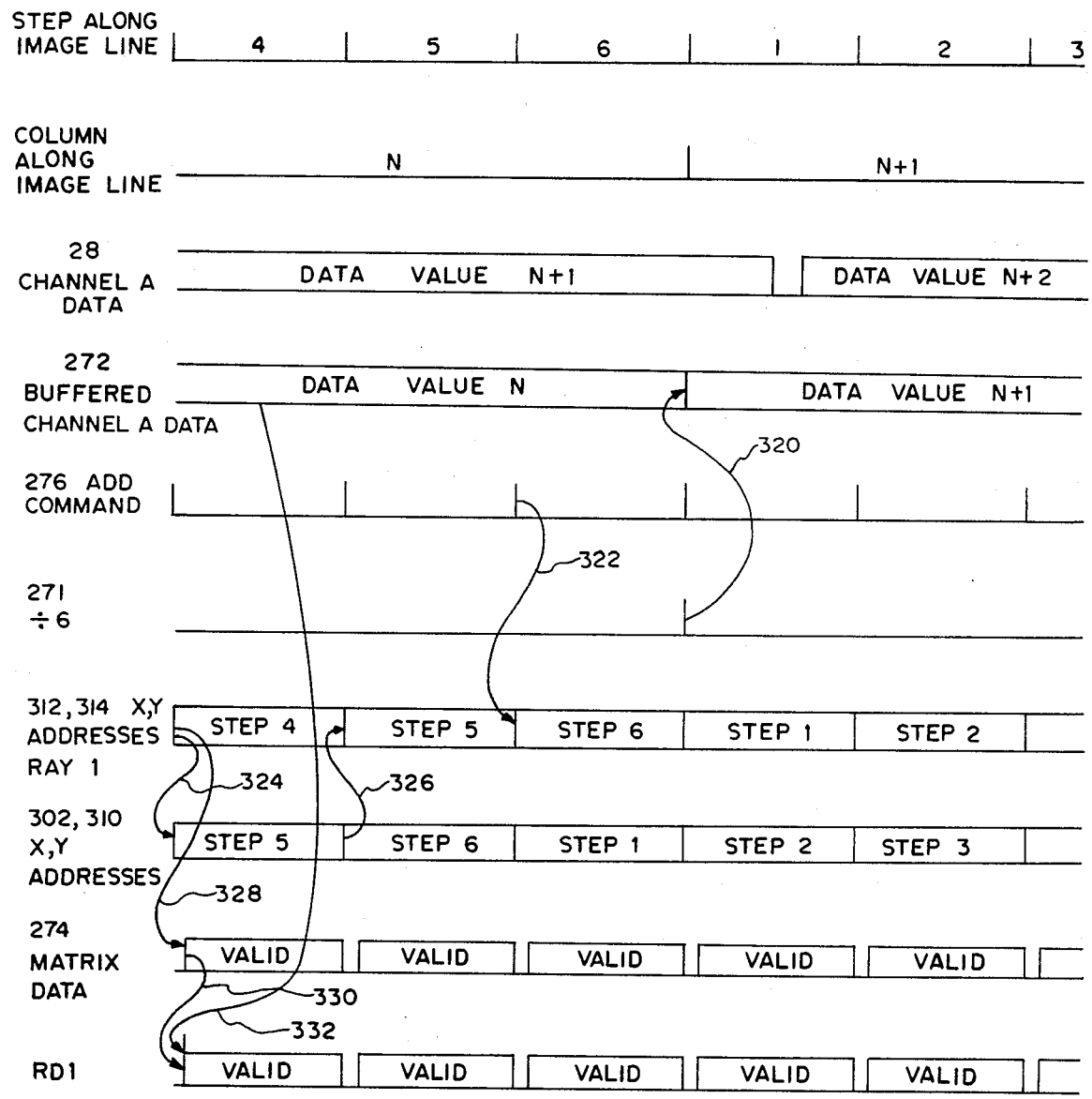
FIG. 15 is a timing diagram of signals occurring on the leads of FIG. 14 in general relationship to image line columns and steps.

In FIG. 15, the scaled density data value such as DATA VALUE N (N-ANY POSITIVE INTEGER) appears on leads 272 in FIG. 14 at the corresponding Column N along the image line (see FIG. 6). The succeeding DATA VALUE N+1 for the next column N+1 along the line is applied on leads 28 of Channel A Data to the inputs of register 268. Clocking of successive density values into register 268 occurs under control of the clock signal on leads 271 from divide by 6 counter 270. This is indicated by arrow 320 in FIG. 15.

The add command signal on lead 276 clocks successive X, Y addresses to screen matrix memory 264 on leads 312, 314. This is indicated by arrow 322 in FIG. 15.

The X, Y addresses on leads 296, 304 are applied to the inputs of adders 298, 306, as is indicated by arrow 324. The outputs of address 298, 306 on leads 302, 310 then are clocked into X, Y-address registers 288, 290 as is indicated by arrow 326 on the ADD COMMAND signal.

Arrow 328 indicates that the X, Y addresses applied to memory 264 result in the matrix data value on leads 274 being valid a propagation time thereafter.

Valid matrix data indicated by arrow 330 and density data indicated by arrow 332 then result in valid data at RD1, the output of operating circuit 260.

This timing diagram is understood to be illustrative of the general timing principles involved and may be modified to adapt it to a particular implementation.

After imaging, the member 36 is toned and the toned images are either fused to member 36 or transferred to another carrier. Thereafter, the member 36 or other carrier is treated to render toned areas hydrophobic and untreated areas hydrophilic and the member 36 or carrier is directly used as the printing plate in a lithographic printing press.

Variations of the disclosed embodiment may be made without departing from the spirit of the invention. For example, the size of the screen matrix may be increased or decreased and values intermediate those of the matrix may be determined by interpolation. More or fewer binary element data values may be determined in parallel by more or fewer associated memory and comparison circuits. Lithographic film or other light or radiant energy sensitive media may be imaged instead of an electrophotographic member.

The invention disclosed may be used to advantage whenever electronic half-tone reproduction is desired or performed with whatever media used.

We claim:

1. A method of producing a half-tone reproduction of a varying tone original image, comprising:
   A. providing scaled density information data representing the varying tone of the original image with each datum representing the scaled density of the tone in a scanned incremental area of the original image and including simultaneously presenting said data from a plurality of rows;
   B. digitally comparing each presented sealed density information datum from each scan row with a plurality of screen matrix information data that include desired half-tone screen frequency and angle information to produce therefrom a plurality of binary element information data that include both scaled density information and screen frequency and angle information;
   C. imaging a member to form thereon sequential binary elements along finite lines on said member in accordance with said binary element information data, said element forming the half-tone reproduction of the varying tone of the original image at the desired screen frequency and angle, there being one binary element formed in response to each binary element information datum; and
   D. the step of digitally comparing including addressing said screen matrix information data, there being a plurality of address bits that are incremented by a certain value for each binary element formed along the lines on the member and said certain value including a round-off error, said addressing including using a group of the most significant address bits to address each screen matrix information datum and providing a sufficient number of address bits to avoid said round-off error affecting said group of most significant address bits until beyond the end of said image lines.

2. The method of claim 1 in which said comparing includes producing parallel binary element information data from each scaled density information datum.

3. The method of claim 2 in which said producing includes producing a series of parallel binary element information data from each scaled density information datum.

4. The method of claim 1 in which said comparing includes determining the number of binary element information data produced from one scaled density information datum in accordance with the desired screen frequency.

5. The method of claim 4 in which the number of binary element information data produced from one scaled density information datum is constant for each screen frequency.

6. The method of claim 5 in which the screen frequency is periodic, the screen matrix information data includes a matrix of values representing one screen frequency period with multiple periods being obtained by stepping through said matrix of values multiple times, and said comparing includes selecting values from said matrix for digital comparison to said scaled density information data.

7. The method of claim 6 including selecting matrix values from more than one period.

8. The method of claim 6 including selecting matrix values from only one period.

9. The method of claim 6 including selecting matrix values from less than one period.

10. The method of claim 1 in which the sequential binary elements resulting from each scaled information datum are formed in one image pixel.

11. The method of claim 10 including forming the elements in every image pixel in a group.

12. The method of claim 11 including forming the elements in every image pixel in a contiguous group.

13. The method of claim 1 including imaging the member at stepped locations along a plurality of image lines, each image line having a width determined by a number of ray positions at which rays of light may and may not be formed, the rays being equally grouped in rows, there being image incremental areas located at the intersections of the ray positions and steps, the rays forming binary elements of one sense or the other in the image incremental areas and the rays being formed and not being formed in accordance with the sense of the corresponding binary element information data.

14. The method of claim 13 including providing twelve ray positions across the width of an image line equally grouped in two rows of six ray positions each.

15. The method of claim 13 including forming, in each row of rays, the binary elements resulting from the scaled density information data of each scan row.

16. The method of claim 14 including forming, in each row of rays, the binary elements resulting from the scaled density information data of each scan row.

17. The method of claim 1 including forming multiple half-tone reproductions of the original image on the member in one pass over the surface of the member.

18. An apparatus for producing a half-tone reproduction of a varying tone original image, comprising:
A. source means for providing scaled density information data representing the varying tone of the original image with each datum representing the scaled density of the tone in a scanned incremental area of the original image and said source means simultaneously presenting said data from a plurality of rows;
B. comparison means for digitally comparing each presented scaled density information datum from each scan row with a plurality of screen matrix information data that include desired half-tone screen frequency and angle information to produce therefrom a plurality of binary element information data that includes both scaled density information and screen frequency and angle information;
C. imaging means for imaging a member to form thereon sequential binary elements along finite lines on said member in accordance with said binary element information data, said elements forming the half-tone reproduction of the varying tone of the original image at the desired screen frequency and angle, there being one binary element formed in response to each binary element information datum; and
D. said comparison means including addressing means for addressing said screen matrix information data, said addressing means including an address register having a plurality of address bits that are incremented by a certain value for each binary element formed along the lines of the member and said certain value including a round-off error, said addressing means for addressing each screen matrix information datum with a group of the most significant of said address bits and said address register having a sufficient number of address bits to avoid said round-off error affecting said group of most significant address bits until beyond the end of said image lines.

19. The apparatus of claim 18 in which said comparison means produce parallel binary element information data from each scaled density information datum.

20. The apparatus of claim 19 in which said comparison means produce a series of parallel binary element information data from each scaled density information datum.

21. The apparatus of claim 18 in which said comparison means include means for determining the number of binary element information data produced from one scaled density information datum in accordance with the desired screen frequency.

22. The apparatus of claim 21 in which the number of binary element information data produced from one scaled density information datum is constant for each screen frequency.

23. The apparatus of claim 22 in which the screen frequency is periodic, the screen matrix information data includes a matrix of values representing one screen frequency period with multiple periods being obtained by stepping through said matrix of values multiple times, and said comparison means include means for selecting values from said matrix for digital comparison to said scaled density information data.

24. The apparatus of claim 23 in which the selecting means select matrix values from more than one period.

25. The apparatus of claim 23 in which the selecting means select matrix values from only one period.

26. The apparatus of claim 23 in which the selecting means select matrix values from less than one period.

27. The apparatus of claim 18 in which those elements which result from each scaled density information datum are formed in one image pixel.

28. The apparatus of claim 27 in which the imaging means form the elements in every image pixel in a group.

29. The apparatus of claim 28 in which the imaging means form the elements in every image pixel in a contiguous group.

30. The apparatus of claim 18 in which the imaging means are capable of providing a number of rays of radiant energy corresponding to the number of bits in every binary element information datum, the rays being swept across the member at ray positions thereat, the positions being equally grouped in rows and the rows determining the width of an image line, the imaging means imaging the member at stepped locations along a plurality of the image lines, there being image incremental areas located at the intersections of the ray positions and steps, the rays forming binary elements of one sense and the other in the image incremental areas in accordance with the sense of the corresponding binary element information data.

31. The apparatus of claim 30 in which the image means provide twelve ray positions across the width of an image line, equally grouped in two rows of six ray positions each.

32. The apparatus of claim 30 in which the image means, form in each row of rays, the binary elements resulting from the scaled density information data of each scan row.

33. The apparatus of claim 31 in which the image means form, in each row of rays, the binary elements resulting from the scaled density information data of each scan row.

* * * * *